(12) United States Patent
Rezvani et al.

(10) Patent No.: US 7,039,391 B2
(45) Date of Patent: May 2, 2006

(54) METHOD AND SYSTEM FOR COMMUNICATING WITH A WIRELESS DEVICE

(75) Inventors: Babak Rezvani, Ossining, NY (US); Jack L. Chen, Astoria, NY (US); Mathew Joel Laibowitz, New York, NY (US); Edward Brian Kalin, Easton, CT (US); Mehrdad Ghalebi, Ossining, NY (US)

(73) Assignee: Xanboo, Inc., New York, NY (US)

( * ) Notice: Subject to any disclaimer, the term of this patent is extended or adjusted under 35 U.S.C. 154(b) by 529 days.

(21) Appl. No.: 09/776,071

(22) Filed: Feb. 1, 2001

(65) Prior Publication Data

US 2002/0077077 A1 Jun. 20, 2002

Related U.S. Application Data

(60) Provisional application No. 60/253,359, filed on Nov. 28, 2000, provisional application No. 60/253,358, filed on Nov. 28, 2000, and provisional application No. 60/253,464, filed on Nov. 28, 2000.

(51) Int. Cl.
*H04M 1/66* (2006.01)

(52) U.S. Cl. .................... 455/411; 455/435.1; 340/505; 340/825.69

(58) Field of Classification Search ................ 455/115, 455/126, 411, 420, 410, 418, 419; 340/825.69, 340/825.72, 310.07, 310.06, 310.08, 5.2, 340/5.21, 5.8, 825.52; 379/110.01
See application file for complete search history.

(56) References Cited

U.S. PATENT DOCUMENTS

| | | | | |
|---|---|---|---|---|
| 5,194,978 A | * | 3/1993 | Heep | 398/112 |
| 5,471,668 A | * | 11/1995 | Soenen et al. | 455/352 |
| 5,802,467 A | * | 9/1998 | Salazar et al. | 455/420 |
| 5,822,359 A | * | 10/1998 | Bruckert et al. | 375/145 |
| 5,963,624 A | * | 10/1999 | Pope | 379/110.01 |
| 6,049,289 A | * | 4/2000 | Waggamon et al. | 340/5.23 |
| 6,198,408 B1 | * | 3/2001 | Cohen | 340/825.69 |
| 6,542,076 B1 | | 4/2003 | Joao | 340/539 |
| 6,542,077 B1 | | 4/2003 | Joao | 340/539 |
| 6,549,130 B1 | | 4/2003 | Joao | 340/539 |
| 6,587,046 B1 | | 7/2003 | Joao | 340/539.14 |
| 6,667,684 B1 | * | 12/2003 | Waggamon et al. | 340/5.71 |
| 6,686,838 B1 | * | 2/2004 | Rezvani et al. | 340/506 |
| 6,844,900 B1 | * | 1/2005 | Yuen | 348/734 |
| 6,873,824 B1 | * | 3/2006 | Flick | 455/41.2 |

* cited by examiner

*Primary Examiner*—Charles N. Appiah
(74) *Attorney, Agent, or Firm*—Pollack, P.C.; Grant E. Pollack

(57) ABSTRACT

A method, system, transmitter, receiver and protocol are disclosed for communicating with wireless receivers. The invention includes providing a controller having a discovery mode and an operating mode, in the discovery mode the controller is capable of registering wireless devices, in the operating mode the controller is capable of receiving transmissions from a wireless device that has been registered. A wireless transmitter is provided which is capable of communicating wirelessly with the controller. The wireless device has an actuator for initiating at least one transmission of registration data. When the controller is placed into the discovery mode, and the actuator of the wireless device is actuated to wirelessly transmit the registration data from the wireless device to the controller, whereby the wireless device is registered with the controller. The wireless data contains data that allows the controller to interface with the wireless device.

58 Claims, 11 Drawing Sheets

METHOD AND SYSTEM FOR COMMUNICATING WITH A WIRELESS DEVICE

This application claims benefit of provisional No. 60/253,359 Nov. 28, 2000 which claims benefit of provisional No. 60/253,358 Nov. 28, 2000 and claims benefit of provisional No. 60/253,464 Nov. 28, 2000.

BACKGROUND OF THE INVENTION

The invention relates to systems and methods for communicating with wireless devices.

Many systems today use wireless devices to transmit information. Television remote controls transmit information to a television via infrared signals. Cellular phones use radio frequencies to send and receive information. Wireless systems for monitoring inmates in a location employ the tight coupling of a transmitter on an inmate to the center point receiver in order to alert a "break out" condition when the inmate wanders outside the allowed radius of the receiver. In order for any transmitter in such systems to communicate with it's corresponding receiver, that receiver needs to know intimate knowledge about the types of transmitters attempting the communication, the protocols those transmitters are using, and specific instance information about the particular transmitters.

In a first example, television remotes are made for and are hard wired for a particular television or class of televisions that those remote controls control. The knowledge in this system about the types of remote control transmitters that the receiver television expects is intimately bundled together since the television remote comes in the same package as the television. There is also an implicit understanding that the receiver television will understand the remote control transmitter bundled with that television. The knowledge about the protocols used by the remote control to communicate with the television are hard-wired into the remote as specific infrared signals that are sent when certain buttons are pressed. The television knows what to expect because it is hard-wired to receive and process a specific set of signals. As such, only a remote made for that particular television or class of televisions is able to communicate with that television and is able to be used to control that television—with the caveat that learning remotes, universal remotes, and the like, can mimic the particular remote in question. In such a system, registration is not necessary as the hard-wired nature of the transmitter and receiver programmed at the factory serve as the only registration necessary. Such a level of simplicity is desirable in certain systems, but the flexibility and lack of transmitter uniqueness in such a system is undesirable.

As a second example, a cellular telephone operates in a very different manner. Cellular telephones work on the principle that each specific instance of a telephone handset is different, and the exact identification of particular instances of a cellular telephone is critical. A cellular provider only wants individuals registered with their services and in good standing to use their networks. Not every cellular telephone is able to or should be allowed to use the network. The electronic subscriber number, or ESN, is used at registration time to identify cellular phones within the system. In fact, typically, a user must call the service provider and verbally provide the ESN in order to be allowed access to services on that service provider's network. Each time a call is placed, the ESN serves as the authentication token to gain access to the network. The ESN is stored on the service provider's system and compared against the one sent by the phone when a call is made or when heartbeat event occurs.

The particular protocol used can then be programmed into the phone at registration time or may have already been programmed into the phone earlier. Such a system creates an ownership and privilege relationship between the phone and the service provider which can be crucial since increasingly large numbers of individuals make use of wireless devices in close proximity to one another. As such, it is important to prevent spurious devices from gaining access to a user's local domain. The identification of a wireless transmitter with it's associated receiver through registration, as in cellular phone registration, is the solution. However, such a process can be cumbersome enough for one phone and is especially burdensome when a user needs to register ten, or even one hundred, phones.

In a third example, The wireless inmate tracking devices are a hybrid of the above two concepts. Like cell phones, these devices can use an authentication scheme similar to the ESN scheme employed by cell phones. These wireless monitoring systems transmit a packet of information at a designated time interval in order to note the existence of the inmate. If an appropriate packet is received within the time interval specified, then the inmate is deemed to be in the acceptable radius while the absence of a regularly scheduled packet signifies the possible escape of such an inmate. To avoid the possibility that a person could use a similar device to mimic their tracking device, and, thus, escape under the guise of perceived existence, an authentication token can be used that is similar to an ESN. The affinity gained by such an ESN-like scheme captures the unique relationship necessary to correctly identify and distinguish the presence of the inmate within the allowable radius. The registration for such devices, however, are often hardwired by the manufacturer, the manufacturer burning in the identification information on both the transmitter and the receiver and shipping both transmitter and receiver bundled together. Such devices possess the ease of use inherent to television remote controls which do not require unique identifiers, but they still suffer from the requirement that identifying information must be hard-coded by the manufacturer.

Thus, there exists a need to have a system in which the registration of the transmitter devices is flexible and sufficiently easy to perform by a user, which can be performed repetitively without becoming burdensome. In addition, there exists a need for the system which, at the same time, guarantees the uniqueness of the transmitter devices and allows access restrictions necessary for users to effectively manage their local domain of devices. It is therefore an object of the present invention to provide improved systems and methods for registering and authenticating wireless devices.

Another problem that frequently arises in many wireless receiver/transmitter systems is the problem of clock drift between the controller 28 (the receiver) and the wireless control devices 210 (the transmitter). This is especially the case where inexpensive asynchronous transmitters and/or receivers are utilized that have inexpensive RC oscillators or the like that serve as the clock. Typically, these RC oscillators are unstable clocks and require periodic resynchronization to be useful. What's more, the slight variation in the current drawn from batteries, which many of these wireless control devices use, frequently cause the oscillators to run at slightly skewed rates as compared one to another. As such, these inexpensive receivers and transmitters which have unstable clocks are prone to drifting out of synchronization over time, causing errors in the data that often cannot be recovered from.

Because a data bit exists as either a high voltage signal or a low voltage signal, for encoding a 1 or a 0, and because that voltage is changed every regular time interval, clock drift can quickly cause the transmitter and the receiver to think that one is sending one bit while the other is reading another bit. In a transmitter/receiver system with a one second clock drift after five seconds and a one second time interval serving as the regular window in which a bit is encoded, after five seconds a receiver would be out of sync by an entire bit after 5 bits, causing the receiver to think that it is reading either the sixth or the fourth bit after the first five seconds. It is clear that such a data read would be erroneous.

One solution is to employ the use of highly synchronized crystals to keep a regular time in the transmitter and the receiver. For several reasons, this is undesirable generally. For fairly "inexpensive" devices, such as a light switch or a smoke detector, the grade of synchronized crystals needed to keep the clock drift problem at bay can result in a significant cost of the manufacturing of such "inexpensive" devices going to the cost of the crystals. Moreover, the data pins on a microprocessor in "inexpensive" devices are often in short supply as product manufacturers squeeze more functionality out of these "inexpensive" devices. A crystal can take up more than one pin while more traditional systems, perhaps using the clock inherent in battery-based clocks, take up only one pin on the microprocessor.

Therefore it is another object of the present invention to find a scheme which allows devices employing "inexpensive" oscillators to be used in a way which will allow arbitrarily long multi-byte transmissions in the face of clock drift.

SUMMARY OF THE INVENTION

This and other objects of the invention are accomplished in accordance with the principles of the present invention by providing a method, system, transmitter, receiver and protocol are disclosed for communicating with wireless receivers. The invention includes providing a controller having a discovery mode and an operating mode, in the discovery mode the controller is capable of registering wireless devices, in the operating mode the controller is capable of receiving transmissions from a wireless device that has been registered. A wireless transmitter is provided which is capable of communicating wirelessly with the controller. The wireless device has an actuator for initiating at least one transmission of registration data. When the controller is placed into the discovery mode, and the actuator of the wireless device is actuated to wirelessly transmit the registration data from the wireless device to the controller, whereby the wireless device is registered with the controller. The wireless data contains data that allows the controller to interface with the wireless device.

The data that allows the controller to operate the wireless device may include parameters, device descriptors, and rules associated with the operation of the wireless device.

In one form of the invention the wireless device comprises an RF transmitter capable of receiving RF transmissions from the wireless device. The wireless device may further comprises an IR transmitter capable of receiving IR transmissions from the wireless device. In the discovery mode of the controller, the wireless device may transmit the registration data via the IR transmitter to the controller.

The actuator of the wireless device may comprise a mechanical control, an electrical control, a software control, a physical control, a tactile control, or an audible control.

The wireless device may be a wireless sensor having a sensor front end for receiving event data. The wireless sensor may include a nonvolatile storage device for storing a serial number associated with the sensor device. The non-volatile storage device further stores functional parameters for the sensor front end and the functional parameters for the sensor device may be transmitted along with the registration data.

In one form of the invention, the controller returns to the operational mode automatically after at least one wireless device has been successfully registered. In another form of the invention, the controller returns to the operational mode automatically after a preselected time interval. In yet a further form, the controller includes an actuator for switching between the operational mode and the discovery mode. The actuator of the controller may comprises a mechanical control, an electrical control, a software control, a physical control, a tactile control, or an audible control.

The at least one transmission of registration data may comprise a first signature byte for identifying that the at least one transmission is a registration transmission. The at least one transmission of registration data may also comprise a plurality of sequential transmissions. One of the registration data transmissions may comprise a first signature transmission for identifying that the subsequent transmissions are registration transmissions. One of the registration transmissions may comprises a serial number for identifying the wireless device. The serial number may be a unique serial number.

One of the registration transmissions may include a second signature transmission. the second signature byte may be identical to the first signature transmission.

At least one of the registration transmissions may include a circular redundancy check transmission. At least one circular redundancy check transmission may include a plurality of circular redundancy check transmissions.

In one form of the invention, the at least one transmission of registration data includes at least nine transmissions comprising a first signature transmission, a first serial number transmission, a first data transmission, a second serial number transmission, a third serial number transmission, a second data transmission, a second signature transmission, a first circular redundancy check transmission, and a second circular redundancy check transmission.

In one form of the invention, the data transmission includes a synchronization pulse. The synchronization pulse may be located at the start of each data transmission. The synchronization pulse may comprise at least one ON bit and at least one OFF bit or two ON bits and one OFF bit. The controller may resynchronize at the trailing edge of the final ON bit.

A protocol for registering and authenticating wireless device is provided which includes a multi-byte transmission of data having at least one signature byte, at least one data byte, at least one serial number byte, and at least one circular redundancy check byte. Each byte of the multi-byte transmission comprises at least one synchronization bit. The at least one signature byte may comprise a first signature byte and a second signature byte. The at least one circular redundancy check byte may include a first circular redundancy check byte and a second circular redundancy check byte. The at least one serial number byte may comprise a plurality of serial number bytes and/or a plurality of data bytes. In one form of the protocol, the multi-byte transmission of data comprises a first signature byte, a first serial number byte, a first data byte, a second serial number byte, a third serial number byte, a second data byte, a second signature byte, a first circular redundancy check byte, and a second circular redundancy check byte.

The synchronization bit may be located at the start of the transmission, and may comprise at least one ON bit and at least one OFF bit or two ON bits and one OFF bit. The protocol can be a one-way protocol or a multi-way protocol.

BRIEF DESCRIPTION OF THE DRAWINGS

For a more complete understanding of this invention, reference should now be made to the embodiment illustrated in greater detail in the accompanying drawing and described below. In the drawings.

DETAILED DESCRIPTION OF THE PREFERRED EMBODIMENTS

Figure 1:
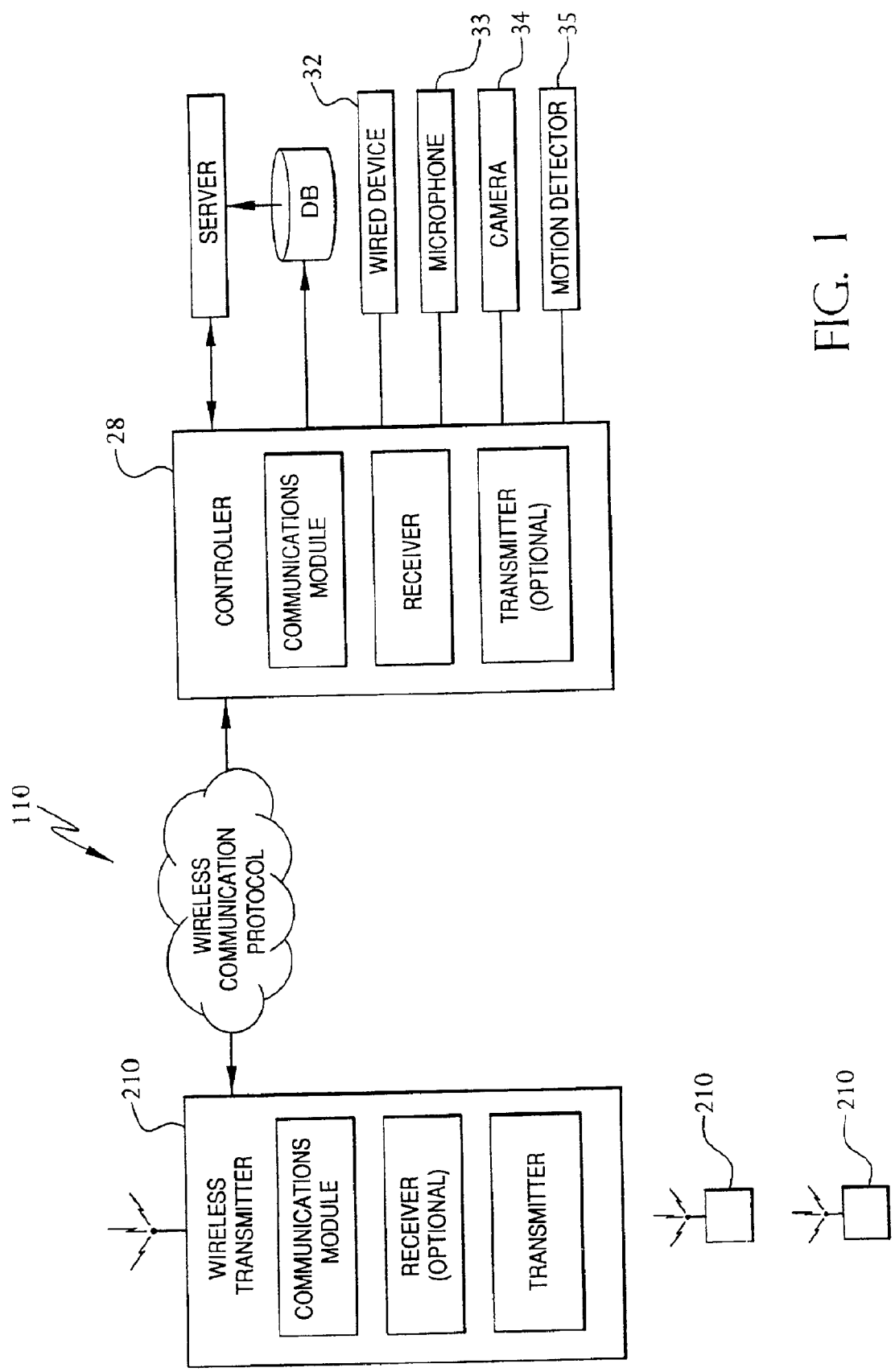
FIG. 1 is a block diagram of an illustrative system for communicating with a wireless device in accordance with a first embodiment of the present invention.

In FIG. 1 there is shown a wireless receiver/transmitter system in accordance with the present invention. The receiver/transmitter system 110 includes a controller 28 and one or more wireless control devices 210, such as sensors, appliances, VCRs, microwave ovens, and thermostats. The controller 28 is capable of interfacing with various wired devices 32, such as a camera 34, a microphone 33, and a motion sensor 35, and is capable of receiving data transmissions from the wireless control devices 210.

Figure 2:
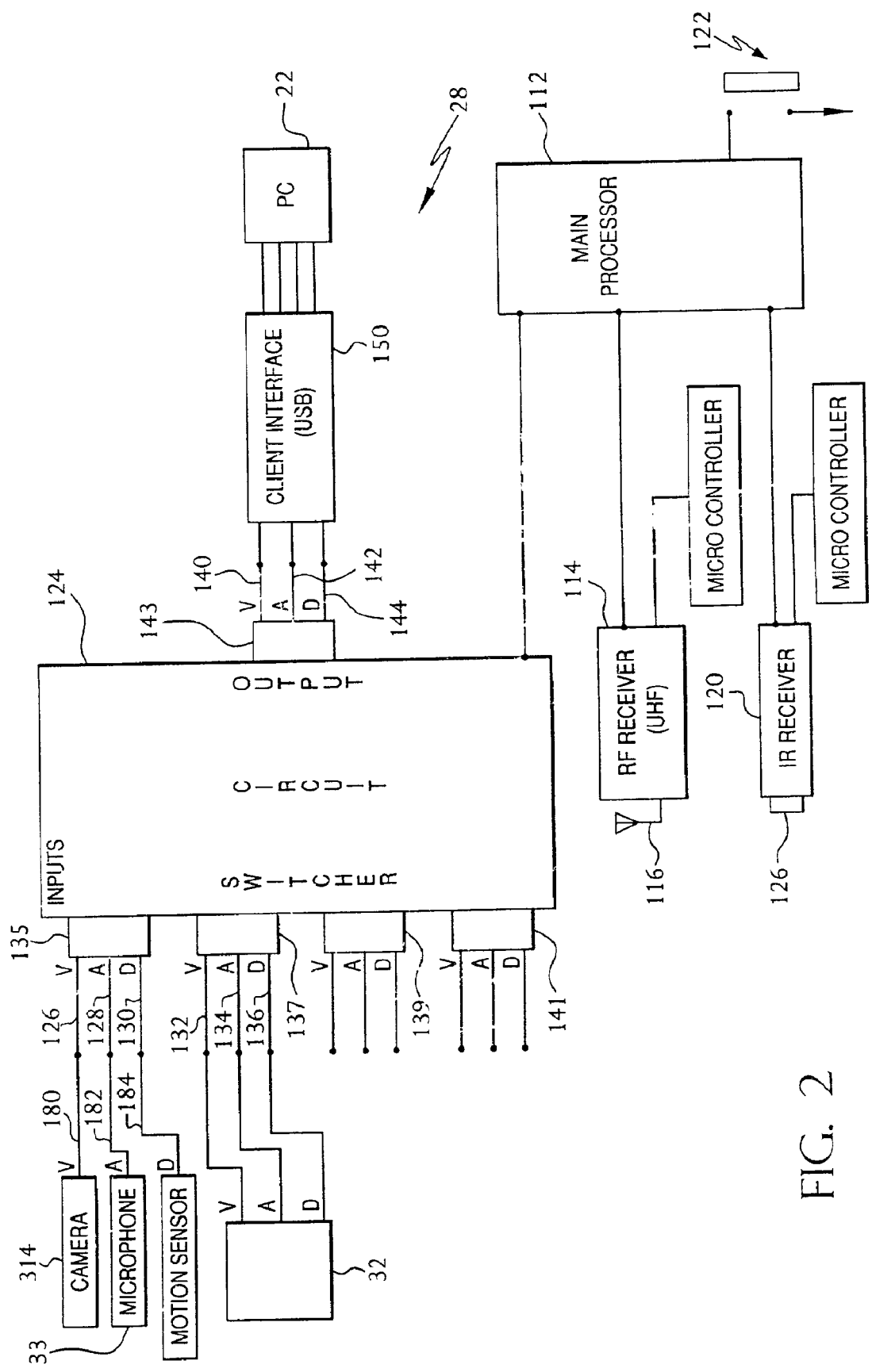
FIG. 2 is a block diagram of a controller for use in the invention of FIG. 1.

A schematic diagram of the controller 28 is depicted in FIG. 2. The controller 28 includes a main microprocessor 112 for controlling a primary wireless receiver, such as an RF receiver 114, and a switcher circuit 124. The RF receiver 114 includes an RF antenna 116 for receiving RF signals transmitted by the wireless control devices 210. Typically, the RF receiver 114 may have its own processor or may use the resources of the main microprocessor 112. It should be understood that any suitable receiver capable of receiving wireless communications, such as an RF or a microwave receiver is within the scope of the present invention.

The Controller may also include a registration channel receiver, such as an IR receiver 120, that is capable of excluding registration of unintended or unauthorized transmitters and inadvertent registration of transmitters with unintended or unauthorized receivers. For example, IR communications require line-of-sight proximity between the transmitter and receiver and are capable of excluding out or range communications. So for example, a user trying to register a wireless camera device having an IR transmitter must typically be in the same room with the receiver controller in order to effect the transmission of data therebetween and would typically not be able to communicate with a receiver controller that is located down the street or at a neighbor's house. Similarly, encrypted communications are also able to exclude unauthorized communications without access to the encryption key. For example, a transmitter may require a smartcard having an encryption key that is known to a particular receiver in order to communicate with that receiver, transmitters without this smartcard would not be able to communicate with the reciver. Of course, any suitable secure channel receiver could be substituted for the IR receiver 120 depicted in the illustrated embodiment.

The infrared receiver 120 includes an infrared signal receiver 126, such as an LED, for receiving infrared signals emitted from the wireless control devices 210. The infrared receiver 120 typically uses the resources of the main microprocessor 112, but it may include its own microprocessor.

The switcher circuit 124 is in two-way communication with the main microprocessor 112. The switcher circuit 124 functions to switch between various video, audio, and/or data inputs from wired control devices 32 connected thereto and functions to connect the switched inputs to an output port 143. The switcher circuit 124 includes a first input port 135 having a first video input 126, a first audio input 128 and a first data input 130. The video output 180 of the camera 34 may be connected to the first video input 126, the audio output 182 of the microphone 33 may be connected to the first audio input 128, and the data output 184 of the motion sensor 35 may be connected to the first data input 130. Of course, the first input port 135 can interface with any device having video, audio, and/or data outputs.

The switcher circuit 124 also includes a second input port 137 having a second video input 132, a second audio input 134, and a second data input 136 for communicating with a second control device 32 having video, audio, and/or data outputs. The switcher circuit 124 can also include any number of additional input ports for interfacing with and switching between additional control devices having video, audio, and/or data outputs 32. In the embodiment shown in FIG. 2, two additional sets of input ports 139 and 141 are depicted.

The input ports may receive video, audio, and data inputs in any combination, such as a audio/video source attached to the audio and video ports of the first input port, a microphone attached to the audio input of the second port, a video-only source attached to the video input third port, and a data source attached to the data input of fourth port. The number of ports is merely illustrative, and it is contemplated that there can be any number of switched input ports.

The switcher circuit 124 also includes an output port 143 having a video output 140, audio output 142, and data output 144. The switcher circuit functions to switch between any video, audio, and/or data input of any of the input ports with the respective video, audio, and/or data output of the output port 143.

Also included is a communication link 138 connecting the switcher circuit with the main microprocessor 112 for passing signals therebetween. The video 140, audio 142, and data 144 outputs of the switcher circuit 124 are in communication with a client interface 150, such as a USB interface set. The client interface 150 is in communication with the client access device 22 such as a personal computer (PC). In operation, the switcher circuit 124 switches between any of the video, audio, and data outputs of any of the device sources 32 connected thereto and the video, audio, and data feeds of the switcher output 143 for communicating the signals to the client access device 22. In addition, RF and IR signals received by the RF receiver 116 and IR receiver 120, respectively, may be routed by the main processor 112 to the client access device 22.

The controller 28 includes a controller actuator 122 for switching between a DISCOVERY mode and an operational mode of the controller 28. The actuator can be any suitable device that is capable of switching between modes of the controller, such as a mechanical button or control, a software control, an electrical control, a physical control, a tactile control, an audible control, or the like. The operational modes of the controller are described in greater detail below.

Figure 3:
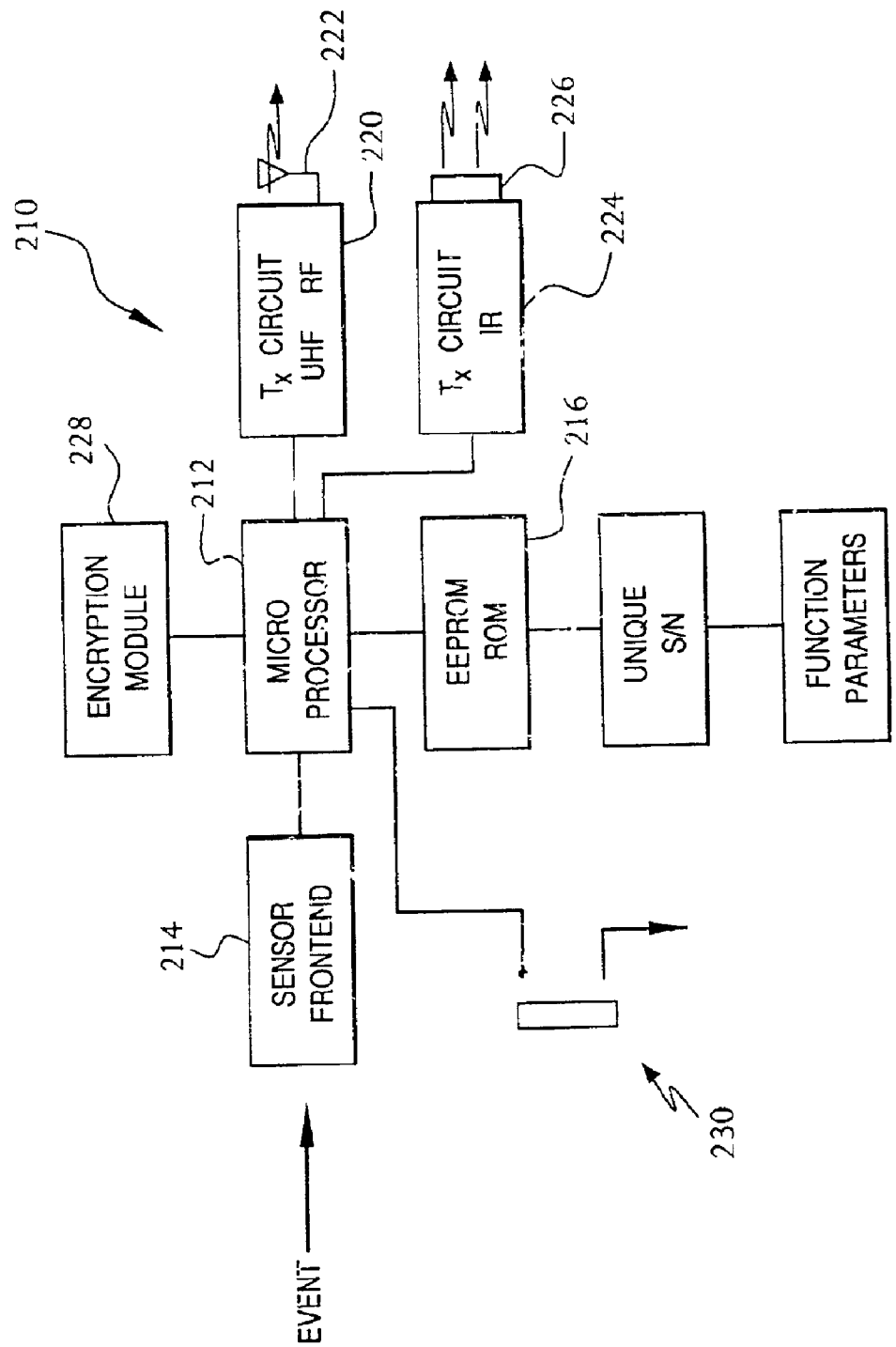
FIG. 3 is a block diagram of a wireless device for use in the invention of FIG. 1.

A typical wireless control device 210 is depicted in FIG. 3. It is contemplated that the wireless control device may be any type of device such as an appliance, clock, or any device that is capable of transmitting data. In addition, the wireless control device may be a sensor type device having a sensor front end for receiving sensor data. The device depicted in the preferred embodiment is depicted as a sensor-type device since such a device encompasses other simpler wireless transmitters. The wireless control device 210 may include a main microprocessor 212. The wireless control device 210 may also include a sensor front end 214 in communication with the main processor 212. The sensor front end 214 functions to capture events and convert the event data received to a form, typically a digital form, that the microprocessor 212 understands. It should be understood that non-sensor devices do not include sensor front ends and merely function to transmit data. It is contemplated that a device, such as a motion detecting camera, may have a sensor front end, and, as such, can perform all the tasks of a sensor front end wireless control device as well as the tasks of a non-sensor front end wireless control device.

The wireless control device 210 further includes a non-volatile storage device 216 such as an EEPROM, ROM, or the like. This non-volatile storage device 216 may store a unique serial number for the device; particular functional parameters of the control device; such as those for the sensor front end 214, for use by the microprocessor 212; and encryption data.

A primary channel transmitter, such as an RF transmitter circuit 220, is provided for transmitting radio frequency signals. The RF transmitter circuit 220 includes an RF transmitter 222 for transmitting the RF signals. The wireless control device 210 may also include a registration channel transmitter, such as an infrared transmitter circuit 224 having an IR emitter 226 for emitting IR signals. Typically, the registration channel is used for securely transmitting registration information to the controller 28. If a registration channel transmitter or receiver is not provided in the system, the primary channel is typically used to transmit registration data.

The wireless control device 210 may also include an encryption or security module or circuit 228 that includes a set of commands, programs, and/or algorithms which manipulate the data transmitted by the wireless control device to secure the transmitted data, by encryption, using code substitutions for signal "words," XOR'ing the transmitted data, or any other suitable method for making the transmitted data more secure. The functionality of the encryption module 228 may be incorporated into the non-volatile storage device as discussed below.

The wireless control device 210 may also include a wireless control device actuator 230 for sending a preselected or generated transmission of data to the wireless control device. The actuator 230 may be any suitable switch-type device such as a button, switch, lever, or other mechanical, electrical, software, or the like controller. In the embodiment depicted in FIG. 3, the actuator is illustrated as a mechanical button.

In another embodiment of the present invention, an actuation of the wireless control device 210 is not required. In this embodiment a heartbeat transmission for maintaining or synchronizing the state of the device may serve as the registration transmission of the registration data. An example of such a system is depicted in connection with the third preferred embodiment illustrated in FIGS. 9–11. As discussed earlier, in addition to sending out registration information and event transmissions, a wireless control device 210 also sends out regular heartbeat transmissions. These heartbeat transmissions may contain the same information as the registration transmissions which are typically sent out when the wireless control device actuator 230 is actuated. The order and number of the bytes for these heartbeat transmissions may be the same as the order and number of bytes of a typical registration transmission. If the controller 28 is in DISCOVERY mode when a heartbeat transmission is transmitted by the wireless control device 210, the wireless device 210 may be registered with the controller 28 as it would if a registration transmission was transmitted by the actuation of the actuator 230. Such a heartbeat registration is asynchronous and does not rely on human intervention. Upon the registration of a wireless device by the occurrence of a heartbeat registration, the controller 28 would return to the operational mode. In this embodiment, placing the controller 28 in DISCOVERY mode is the only human intervention required.

In the illustrated embodiment of the present invention, the wireless transmitter 210 can include various types of devices and sensors such as a door contact sensor, a water level sensor, and acoustic sensor, a POWER ON sensor, a temperature sensor, a smoke sensor, a carbon monoxide sensor, a radon sensor, heat sensor, and the like. Each of these sensors is well-known in the art and functions to sense different types of events as is well-known to those skilled in the art. For example, the POWER ON sensor may have a sensor front end that is capable of detecting a 60 Hz AC current of an electrical device. Similarly, a water sensor typically has a front end which is able to detect an impedance when in contact with a liquid medium.

In normal operation, the wireless control device 210 functions to transmit RF signals via the RF transmitter circuit 220 to be received by the RF receiver antenna 116 of the controller 28. Typically, the sensor front end 214 receives events which are converted into electrical or digital signals and passed to the processor 212 where they are processed and passed to the RF transmitter circuit 220 for transmission. For non-sensor devices, data is merely passed to the transmitter circuit for transmission. In addition, if the wireless control device 210 is provided with an infrared transmitter circuit 224 and is within the line of sight of the IR infrared receiver of the controller 28, infrared transmissions may be transferred between the wireless control device 210 and the controller 28 as described in greater detail below.

One aspect of the present invention is concerned with the ability to automatically detect a wireless control device and register that device with the receiver/controller 28. To effect the auto-detection, the present invention contemplates placing the controller 28 into a DISCOVERY mode by activating the controller actuator 122 or by otherwise placing the controller 28 in a DISCOVERY mode. In the preferred embodiment, this is done by making selections in the software interface of the client access device 22 to send an electrical transmission to the controller 28 to listen for the wireless control devices. It should be understood that there are many other suitable ways for placing the controller 28 into DISCOVERY mode, such as by actuating a mechanical or electrical button or switch located on the controller or some other associated device, by having the transmission of the wireless control device place the controller 28 in DISCOVERY MODE, by providing a voice recognition module for recognizing a command for placing the controller 28 in DISCOVERY mode spoken by the user, or the like. The controller 28 may exit DISCOVERY mode by any suitable way, such as by activating the actuator 122 again, by automatically exiting the DISCOVERY mode upon reaching a preselected time interval, upon a successful registration event, or the like.

Once the controller 28 is in the DISCOVERY mode, the user actuates the wireless control device actuator 230 to send the preselected transmission which preferably, and not by way of limitation, includes a series of data transmissions to the receiver describing authentication information, device type information, device state, and error-checking information, as described in greater detail below. Once the receiver detects an end of transmission from the wireless control device, the control device is successfully registered by the system. Once registration is successful, the wireless receiver may exit DISCOVERY mode either automatically or by actuation by the user and return back to its normal operational mode.

In one form of the invention, the controller 28 needs to know that such a class of device desiring registration exists, requires registration, and needs to know how to handle them for future reference in order to complete a successful registration. For example, in order to register a temperature sensor in the current implementation, the temperature sensor device type is encoded as a portion of the three byte serial number discussed below. This device type is received by the microcontroller 112 via the RF antenna 116 or the IR receiver 120. The device type is then passed to the client access device 22 and a proper entry is made in the software to associate the serial number from the wireless control device 210 just registered with the device type sent as part of that registration transmission.

In another form of the invention, the particular wireless device and its particular functionalities can be unknown to the receiver at the outset and all registration data and data needed to operate the device can be transmitted during the registration process. To demonstrate this, the controller 28 begins in discovery mode. The registration may be effected by actuating the wireless control device actuator 230 on wireless control device 210. The transmission is sent from a wireless control device 210 to controller 28 using RF or IR signals. The device type information located in the serial number byte or bytes, as described below, contains the device type for an "unknown" device. This indicates to the controller 28 that information in the subsequently transmitted data bytes will contain a description of the device, including all the rules necessary to process the information from that device. These data bytes may, in one embodiment, include rules as java code segments, methods, and procedures in a preselected format. Other methods of transferring rules include byte code, alternative structured programming languages, text, XML, and the like. Upon receiving these rules, the controller 28 executes a set of methods to store and install the rules associated with the particular serial number of the wireless control device 210 being registered. Once the end-of-transmission is detected, the wireless control device can begin operating in operational mode and the controller 28 will contain the rules necessary to interpret the information from the wireless control device 210 in order to take proper action on that data.

In another embodiment, parameters that specify what type of device is being registered may be sent. A controller may receive a transmission which specifies certain parameters that describe a device. The controller may be programmed to expect certain keywords and to take particular actions based on the values of those parameters. For example, if the controller receives the keyword "rangemax" and a value 100 and a keyword "rangemin" with the value 0, it could be programmed to automatically assume that this is a device with a range element (like a slider). In addition, another parameter might be "button state 1" with a value of "power on" and a second "button state 2" with a value of "power off". In this case, the intelligence for managing the device exists in the device itself, and the controller serves simply to forward the data back and forth between the client access device in the device's particular transfer medium. In the previous example, an entire java code object, in this case a device driver, could be uploaded by the device to the controller as part of registration. This device driver may simply subclass the super class device driver and may be required to contain certain methods that the controller can execute in order to pass information to and from the object. The object may then be responsible for managing the export of its virtual interface, scheduling updates, interpreting transmissions from the device, or any other activities needed in order to manage and run the device.

In the DISCOVERY mode of the controller 28, the controller 28 is placed in a state in which it is programmed to listen for transmissions from the wireless control devices which desire to be registered. In DISCOVERY mode, all transmissions which are not registration transmissions may, but not by way of limitation, be ignored during the process, allowing the receiver to specifically listen for particular registration transmissions from the wireless control devices and to filter out any erroneous transmissions. For example, a special signature byte, a special code in the data field, or the like can be used to identify the transmission as a registration transmission. In such a case, the controller, in discovery mode, is able to ignore all transmissions that do not have the signature byte or special registration code.

When the actuator on a wireless control device is activated, the wireless control device is forced to send a preselected or generated transmission containing relevant registration information to the controller to allow the controller to properly register that device when the controller is in DISCOVERY mode. In one suitable embodiment of the present invention, When the controller is not in DISCOVERY mode, the preselected transmission may be used as a TEST-type transmission to determine whether the controller 28 is capable of receiving transmissions from the wireless control device under current conditions in order to test for out of range, impeding obstacles, excessive ambient noise, and the like.

The registration transmission can be accomplished by transmitting the registration signals via the RF transmitter or the IR transmitter. Transmitting via the IR transmitter ensures that a particular controller will only receive registration transmission from wireless control devices that are within the line of sight of the controller. This is a security feature that allows the controller 28 to receive only transmissions from wireless control devices in a relatively close range and which prevents inadvertent and/or intentional registration of wireless devices by other nearby users.

When the wireless control devices 210 are in the operational mode, they are capable of transmitting events, such as a change of state of a door sensor (from open to closed), a scheduled heartbeat, or a maintenance signal. The purpose of the heartbeat or maintenance signal may be a periodic or scheduled transmission that updates the controller 28 as to the status of the controlled wireless device 210.

For one embodiment of the present invention, when the wireless control device actuator 230 of the wireless control device 210 is activated by the user, the wireless control device 210 transmits a preselected or generated transmission or series of transmissions. When the controller 28 has been placed in DISCOVERY mode by activation of the actuator 122, the series of transmissions may, in one embodiment, serve as an announcement or registration of the controlled wireless device 210 in the wireless domain. Conversely, when the controller 28 is in its operational mode, the test data transmission may serve, in one embodiment, to ensure that the wireless control device 210 is in range of the controller 28 and/or whether conditions are conducive to transmitting and receiving RF signals, i.e., there is not too much RF interference or other wireless interference and noise.

The structure of the test or registration transmission comprises a series of transmissions that include authentication information, device type data, device state data, and error checking information. In the preferred embodiment, each transmission of data is a byte, or eight bits, in length.

Figure 4:
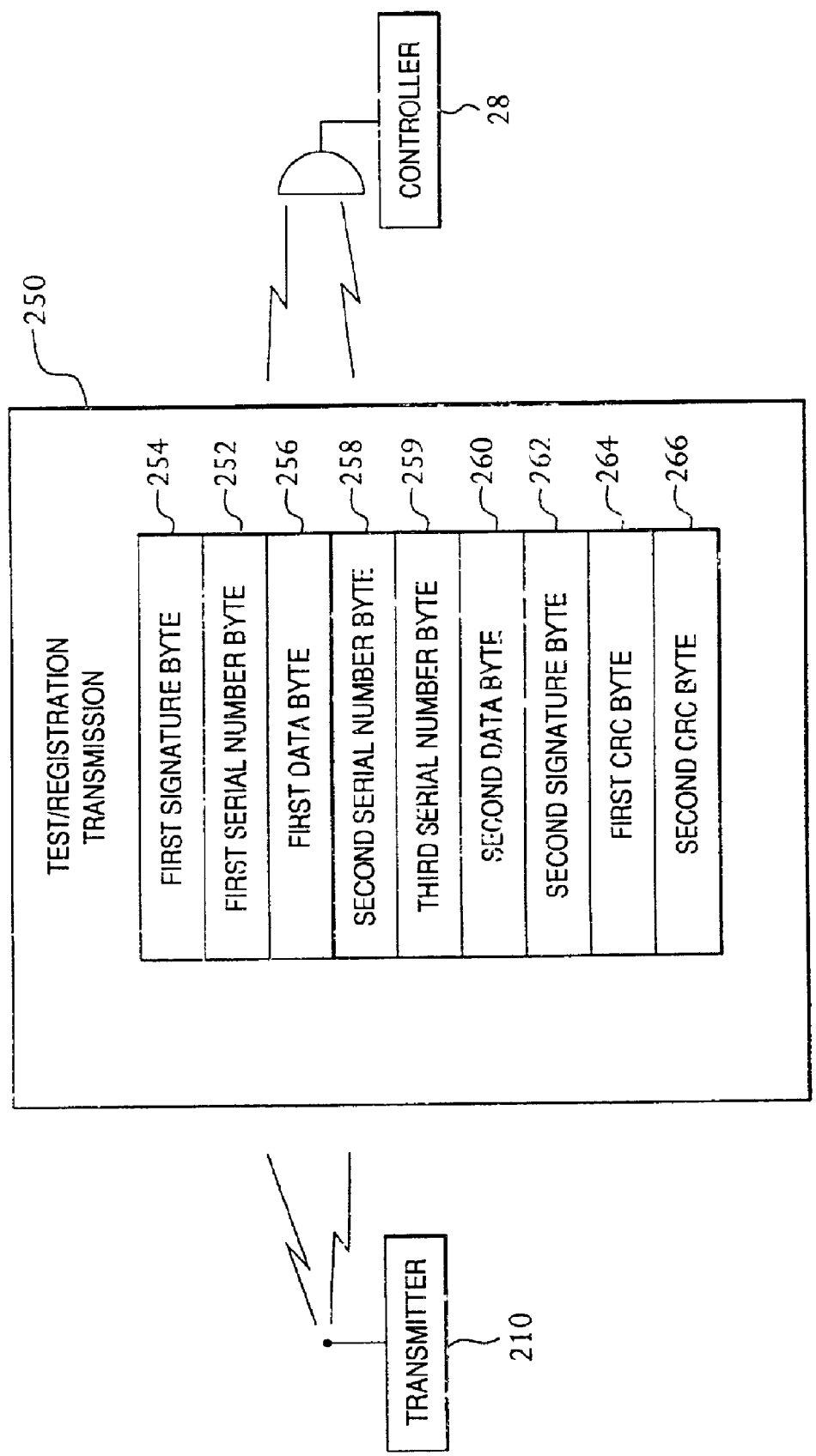
FIG. 4 is a block diagram of the TEST/Registration transmission of the invention of FIG. 1.

As best seen in FIG. 4, the preferred structure of the test or registration transmission 250 comprises a series of nine bytes of data. The first byte 252 is the first of two signature bytes that is used to denote the beginning of the registration sequence. The second byte 254 comprises the first of three serial number bytes that contain the type of the device and to provide any sort of type information necessary to process later data bytes. The serial number and device type data are typically stored in the non-volatile memory 216 of the wireless device. In addition, the first serial number byte 254 may be used to set the controller 28 into a mode where it can correctly categorize the controlled wireless device 210. For example, information relating to the wireless device, device type, where it was purchased, its age, and the like may be encoded into the serial number information which is passed and used by controller 28.

The third byte 256 comprises the first of two data bytes that may contain any sort of information that needs to be transmitted. For purposes of the present invention, the first data payload byte may contain on/off information and any other discreet state information associated with the controlled wireless device 210, such as the number of colors that a lamp may contain or the set of values to expect for a temperature sensor. Thus, the data contained in the first data payload can be combined with additional information contained in the next data bytes to fully describe the state of the device. For example, the first data payload byte can include a pan and tilt code signifying whether the update is a pan or a tilt update for a movable camera and the second data payload may contain specific pan and tilt values.

The fourth byte 258 is the second of three serial number bytes, and the fifth byte 259 is the third of the three serial number bytes. The first, second and third serial bytes together serve as the authentication and identification codes for the wireless control device. Once the wireless device has been successfully registered, the controller 28 may only accept transmissions from devices bearing this serial number, some other already registered serial number, or other devices that are being registered while the controller is in DISCOVERY mode.

The sixth byte 260 contains the second of two data bytes and may include any additional device specific information or the like that might be needed during the transmission.

The seventh byte 262 comprises the second of two signature bytes. In one form of the invention, this second signature byte 262 is identical to the first signature byte 252 and is used as a data integrity check as discussed in greater detail below. In another invention, the first signature byte can signify which protocol is used. In this case, the second signature byte can be a different value, and, when paired with the first signature byte, is understood by the controller as the total identifier expected by the protocol. Of course, other schemes for the signature bytes are known and within the scope of the present invention.

The eighth 264 and ninth 266 bytes comprise a first circular redundancy check (CRC) and a second circular redundancy check (CRC) that are used to guarantee that the data is intact. Typically, the CRC bytes 264 and 266 are used in a checksum algorithm, as is well-known in the art.

Because it is so difficult to accurately and reliably transmit data in a wireless environment under typically noisy conditions, four out of the nine bytes transmitted are present to guarantee the integrity of the transmitted data. As each byte of the transmission is transmitted by the wireless control device 210, it is received and processed by the controller 28. By processing each byte of the data as it is received, as opposed to waiting until the last byte of data has been received and then transmitting the entire transmission of data, the system is able to quickly identify and discard corrupt data or noise. Thus, it is possible to ensure with a high degree of certainty, the reception of accurate transmissions.

For example, the second signature byte 262, as received by the controller 28, must correspond to the byte expected by the practical use as described above, for the entire transmission 250 to be accepted. Of course, the CRC's could take other well known forms, such as a combined 16 bit CRC, that are within the scope of the present invention. If the signature bytes are not received as expected and/or the CRC bytes do not correspond to the CRC bytes expected, the entire transmission is ignored and discarded.

Similarly, in one form of the invention, the first CRC byte and the second CRC byte are identical, as received by the controller 28, for the transmission to be accepted. Because there is a high rate of errors triggered by many random devices transmitting random RF signals, the presence of two data integrity checks in the redundant signature bytes 252, 262 and CRC bytes 264 and 266 ensure with a high rate of certainty that accurate data has been received by the controller 28 and not corrupted data or other noise. The fact that CRC's are built into the algorithm means that the data and serial number bytes are checked for internal integrity while at the same time providing an additional two bytes of noise cancellation.

Once the entire nine byte transmission 250 has been received by the controller 28 and verified as being accurate, the controller 28 knows that it has detected a successful registration and is able to successfully authenticate and process the data received from the wireless device. The serial numbers serve as an authentication token and prevent interference from nearby controllers 28 and wireless devices in the user's space; spurious transmissions will be ignored because the serial numbers of these spurious devices are not registered with a particular controller 28. The DISCOVERY mode of the controller 28 may automatically time out or otherwise automatically end, whereupon the controller 28 returns to its normal operational mode. Alternatively, the controller 28 may be manually switched by the user to its normal operational mode by activating the actuator 122.

The embodiment discussed illustrates a nine byte transmission scheme. It should be understood that the number of transmissions or the transmission length may contain any number of identification or signature bytes, data bytes, CRC bytes, or other checksum techniques for ensuring internal data integrity. The data bytes may contain any type of data besides sensor data, such as algorithms, hardware descriptions, encrypted data, video, audio, number of expected bytes, and the like.

Also, it should be understood that the protocol of the present invention works as a one-way protocol, i.e., no response, acknowledgment or other transmission is required from the controller 28. It should also be understood that the protocol works for up to N-way communications, where N is greater than or equal to 1. By N-ways, it is contemplated that a wireless control device may in fact register with multiple controllers 28 simultaneously or at different times.

In another embodiment of the present invention, a unique token may be transmitted along with the device registration transmission. The unique token is verified to be acceptable by any suitable registration or verification entity, such as the server 14 illustrated in the third preferred embodiment, whereupon the wireless control device 210 is successfully registered.

Not by way of limitation, the unique token may be encoded in the three serial number bytes 254, 258, 259 which are transmitted to the controller 28 during a registration transmission. The controller 28 would send the unique token to the server 14 (FIG. 9), perhaps by way of the client access device 22. The controller 22 would receive back a response from the server notifying the controller whether that token was accepted by the server. Such a method is useful to detect whether the wireless control device has been previously registered in the system 110. If a proper user successfully registered the wireless control device previously, then the unique token would already be present on the server. If a second malicious user attempted to register the same wireless control device with the system 110, the server would refuse the attempted registration due to the previous registration by the proper user.

Figure 5:
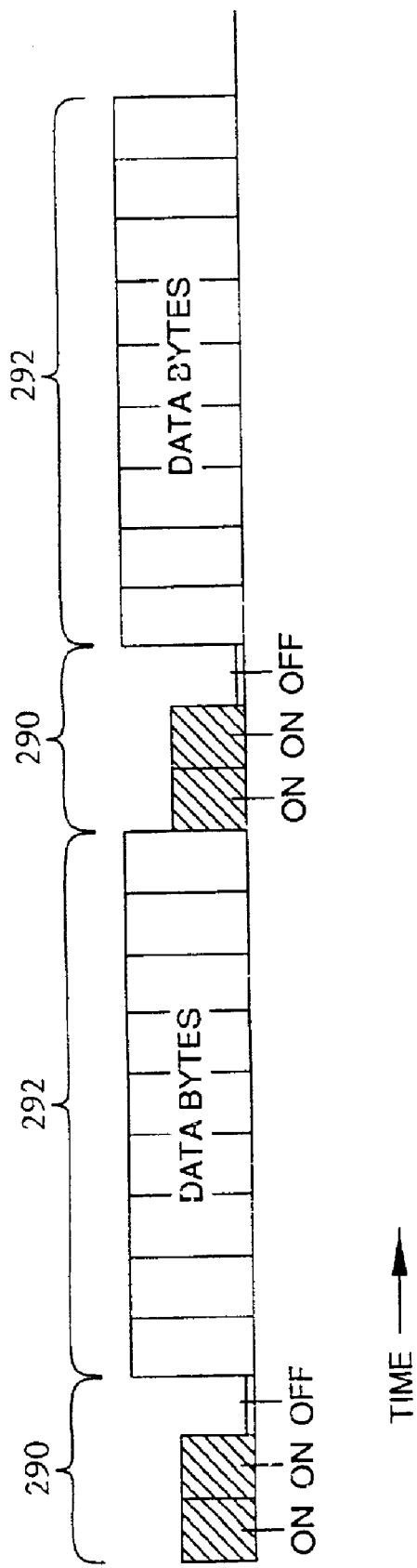
FIG. 5 is a timing diagram of a transmission sent by a wireless device of the invention of FIG. 1.

As best seen in FIG. 5, the present invention solves the clock drift problem by inserting a synchronization pulse 290 at the beginning of each byte of data 292 transmitted by the wireless control device 210. In the preferred embodiment, the synchronization pulse 290 is three bits in length and comprises two ON bits followed by an OFF bit. The receiver recognizes this pattern as being a synchronization pulse and resynchronizes its clock at the trailing edge of the second ON bit.

Depending upon such factors as the bit rate, the stability of the clock, the tolerance of the system, and the like, the transmitter and receiver may stay in synchronization for a number of data bits transferred. For example, for a bit rate of 2400 bits/sec. (4 MHz), a tolerance of ±10 MHz, and a clock, the receiver transmitter system 110 is able to stay reliably in synchronization for at least 8 bits of transmitted data, which is sufficient to transmit one byte of data. It has been found that as long as the clock drift is less than ½ of one bit by the conclusion of an eight bit transmission that the problem of clock drift is eliminated. Of course it should be understood that other combinations of factors could be used to accomplish the task of maintaining the synchronization of a relatively unstable clock over a selected data transmission window.

Figure 6:
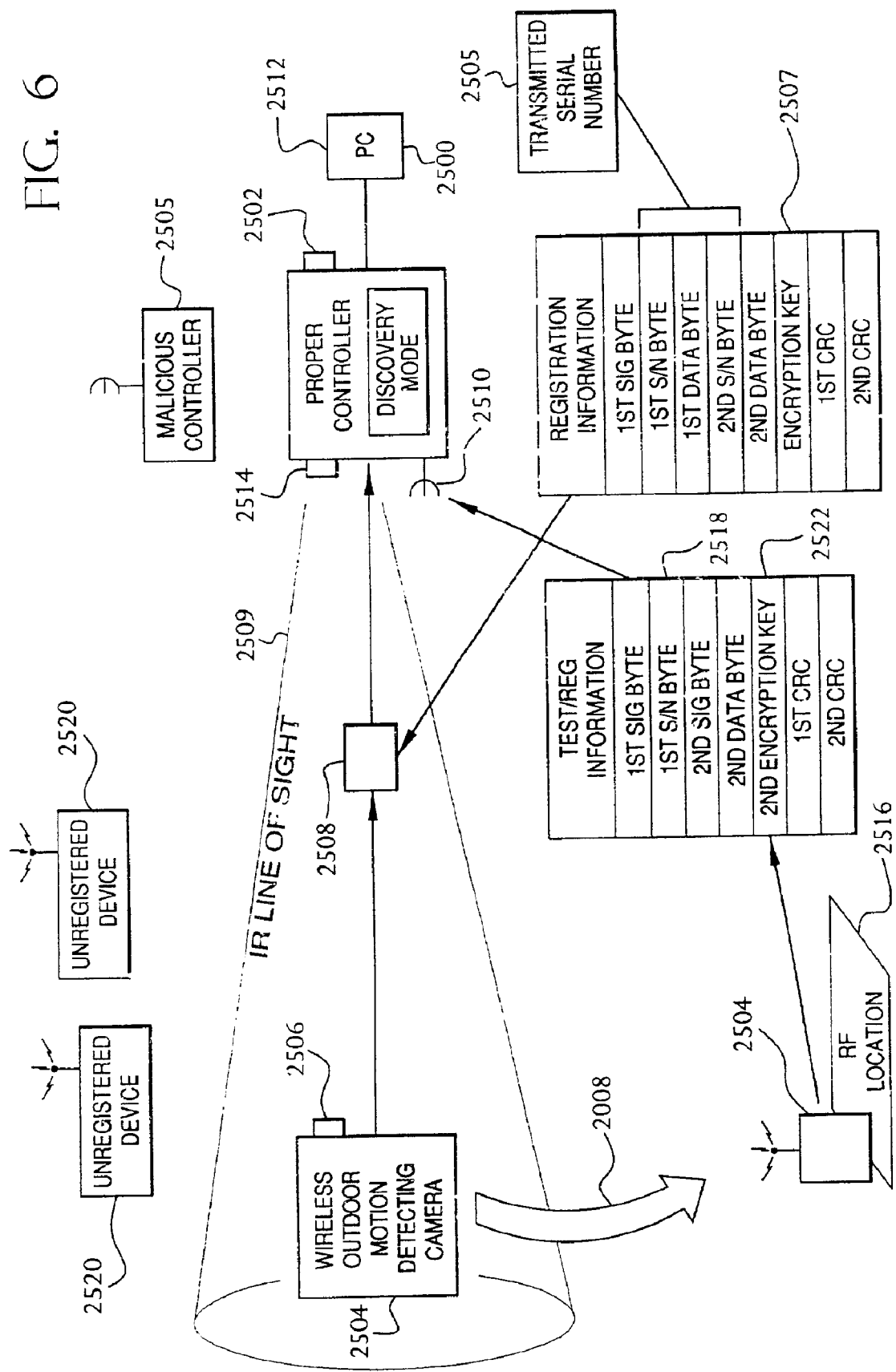
FIG. 6 is a block diagram of an illustrative system for communicating with a wireless device in accordance with a second embodiment of the present invention.
Figure 7:
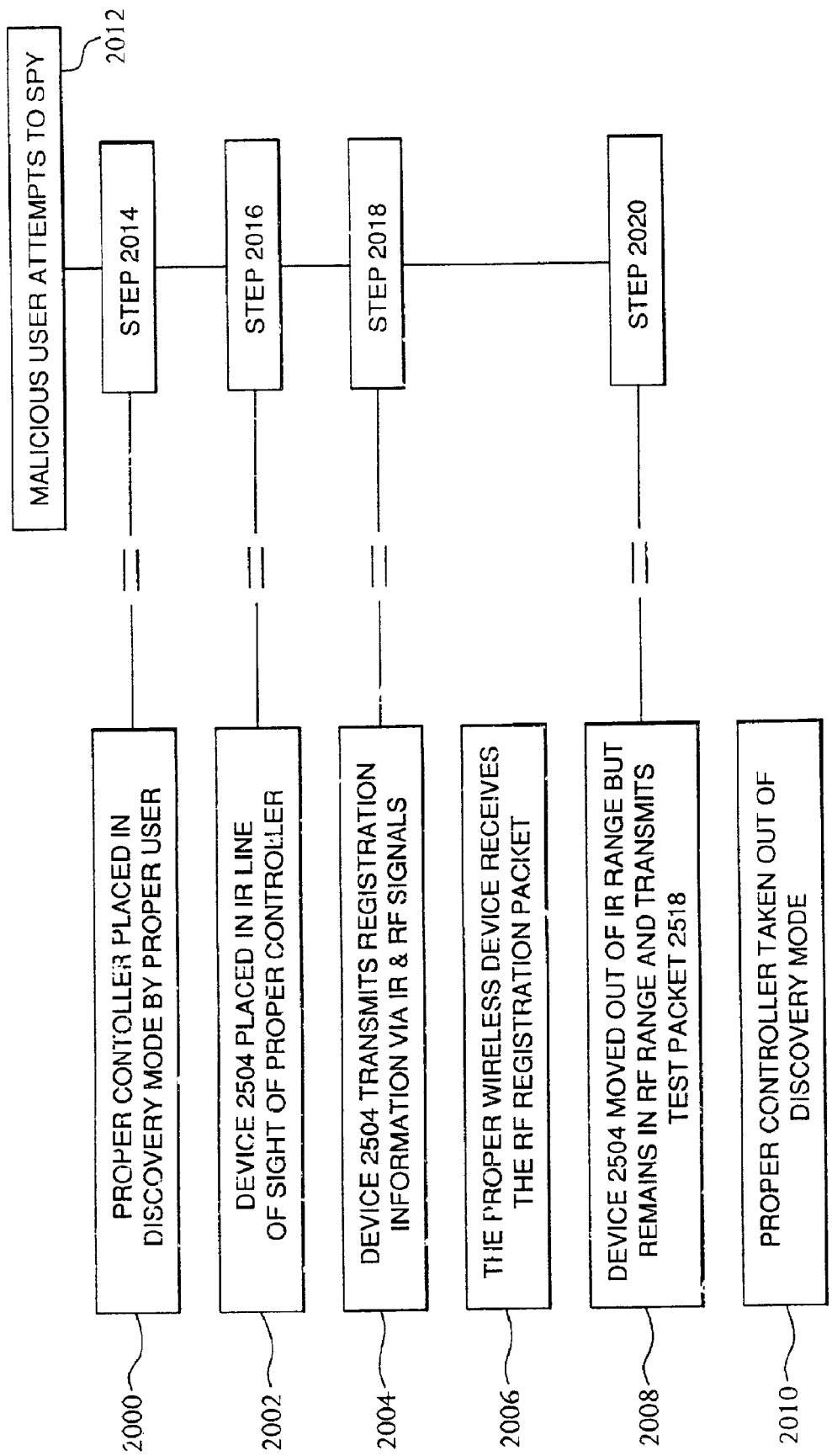
FIG. 7 is a block diagram for the steps involved in carrying out a registration process of the invention of FIG. 6.

In a second embodiment of the present invention depicted in FIGS. 6 and 7, we demonstrate how to securely and authentically communicate between wireless control devices and a controller and show how registration of wireless control devices takes place in order for this to happen. In this embodiment, a first proper controller 2500 and a second malicious controller 2505 are depicted. In this example, a wireless control device 2504 first registers with the proper controller, and subsequently, a malicious user attempts to spy on the wireless control device 2504 registered with the proper controller 2500. The malicious user does this by way of attempting to register the wireless control device 2504 with the malicious controller 2505, thus, hoping to capture all events and data from the wireless control device 2504 during operation. This embodiment contemplates detecting and notifying the user of such a security breach and as a way of showing the system described in connection with the first embodiment in a practical scenario.

As shown in FIGS. 6 and 7, in step 2000, the proper controller 2500 is placed in to DISCOVERY mode by the proper user by actuating the proper controller actuator 2502. In DISCOVERY mode, the proper controller 2500 is in a mode where it is listening for IR and/or RF registration information from one or more wireless control devices that the proper user wishes to register. In step 2002, the wireless control device 2504, an outdoor motion detecting camera, is placed in IR line of sight 2509 with respect to the proper controller 2500. The wireless control device actuator 2506 located on the wireless controlled camera 2504, embodied as a push button, is actuated by the proper user. In step 2004, the wireless controlled camera 2504 transmits registration information 2508 via IR and RF signals to the proper controller 2500. This registration information is in the form of two packets of identical data, one via IR and one via RF, containing, in order, a) a first signature byte.
b) a first serial number byte.
c) a first data byte
d) a second serial number byte
e) a second data byte
f) a randomly generated encryption key byte 2507
g) two bytes of CRC.

The exact order of the bytes and number of each type of byte is presented as an illustrative example and is not intended to limit the scope of the invention.

In step 2006, the proper wireless controller 2500 receives the RF registration packet via the RF antenna 2510. In step 2006, the proper controller 2500 attempts to determine whether a wireless control device with the transmitted serial number 2505 has previously been registered. Since this is the first time that this registration is taking place, the proper controller 2500, with the assistance of client access device 2512, determines that such a serial number does not exist. Thus, the registration packet 2508 is ignored on the RF side. On the IR side, however, the proper controller 2500 receives the registration packet via the IR receiver 2514. The proper controller 2500 parses the registration packet and attempts to determine whether a wireless control device having the transmitted serial number 2505 has been previously registered. Upon determining that such a serial number has not been registered, the proper controller 2500 registers the wireless control device 2504 by cataloging the relevant data along with the transmitted serial number 2505 and the encryption byte 2507. Any future transmissions from the wireless controlled camera 2504 will contain encrypted data bytes which are encrypted using the encryption byte 2507, until the wireless controlled actuator 2506 is pushed again. By using the IR registration method to register the wireless devices the first time, i.e., ignoring all transmissions from any unregistered wireless control devices 2520, including registrations transmitted via RF signals, the present system greatly limits the problem of accidently registering the wireless controlled camera 2504 along with other unregistered controllers 2520 located within RF range. Moreover, requiring registration via IR to take place first, prevents unintended wireless control devices from unintentionally registering with local controller 2500.

In step 2008, the wireless controlled camera 2504 is moved out of IR line of sight to a location 2516 that remains within RPF range. In order to test the system to determine that the proper controller 2500 is able to accurately receive transmissions from the registered wireless controlled camera 2504, the user actuates the wireless controlled camera actuator 2506. A registration/test packet 2518 is sent from the wireless controlled camera 2504 to the proper controller 2500 via RF signals. In fact, wireless controlled camera 2504 has also sent an IR transmission, but because wireless controlled camera 2504 is out of IR line of sight of the proper controller 2500, this mode of transmission will not be picked up by the controller. The registration/test packet 2518 includes a) a first signature byte.
b) a first serial number byte.
c) a first data byte
d) a second serial number byte
e) a second data byte
f) a randomly generated encryption key byte 2522
g) two bytes of CRC.

At this point, the new encryption byte 2522 will be used to encrypt all future transmission data bytes from wireless controlled camera 2504 to proper controller 2500 until the actuator 2506 is actuated again. The proper controller 2500 remains in DISCOVERY mode, receives a registration/test packet via RF and attempts to update the registration information of the previously registered wireless controlled camera 2504 stored therein, notably the new encryption key 2522 which will be used to decrypt future transmissions. In step 2010, the proper controller is taken out of discovery mode by any suitable means including actuating the proper controller actuator 2502.

Figure 8:
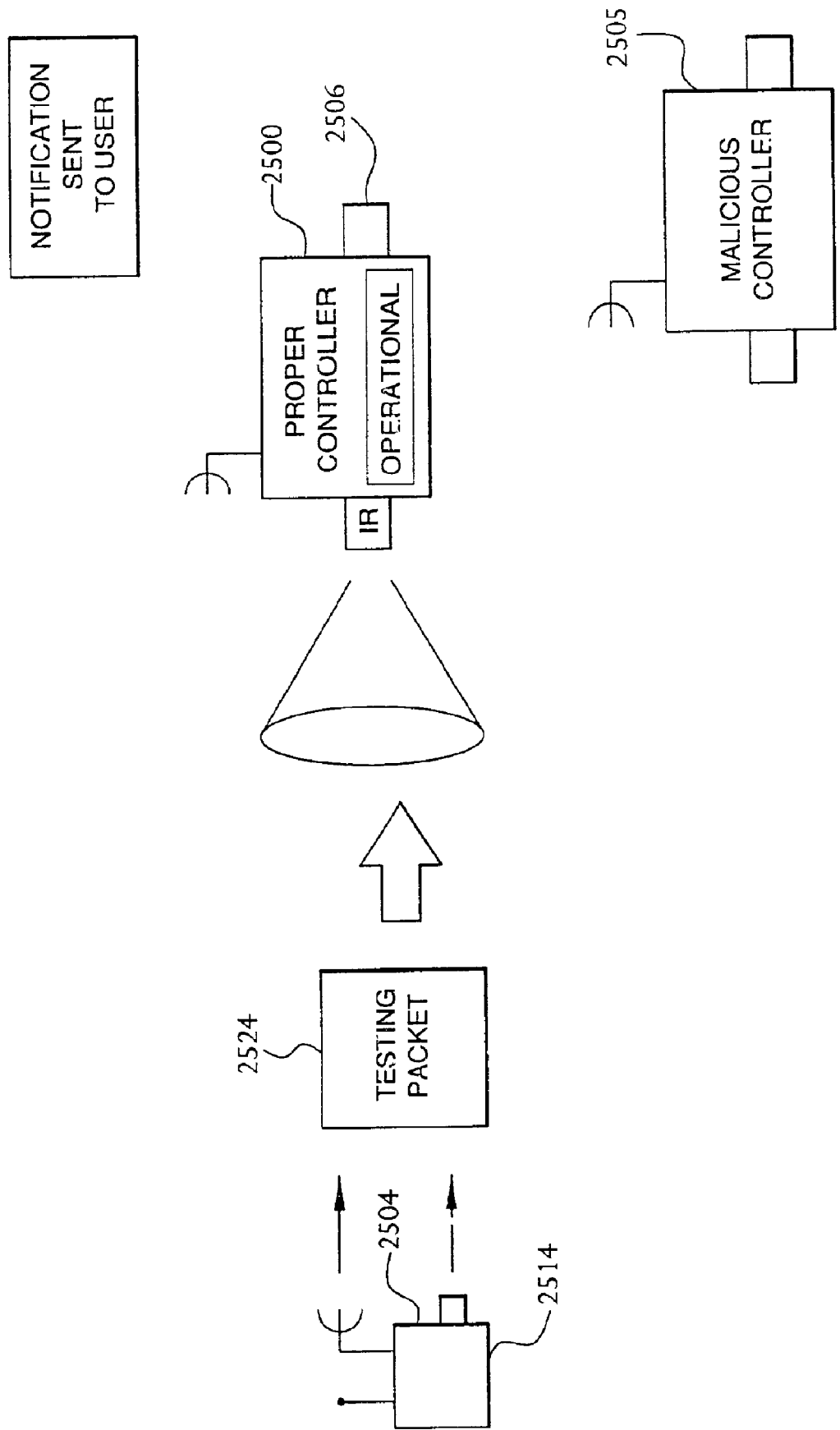
FIG. 8 is a block diagram of an attempted registration by a malicious user in accordance with the second embodiment.

As best seen in FIGS. 7 and 8, in step 2012, a malicious user attempts to spy on the proper user's wireless controlled camera 2504 by registering it in a process very similar to steps 2000–2006. The details of this registration attempt closely mimic that described in steps 2000–2006 and are obvious to those skilled in the art. The steps in the authorized registration corresponding to steps in the malicious registration are steps 2000 and 2014, steps 2002 and 2016, steps 2004 and 2018, and steps 2008 and 2020.

In step 2016, during the malicious controller actuation, a registration/test packet 2524 is sent to both the proper 2500, and malicious 2505 controllers via IR and RF. The proper controller 2500 does not receive the IR transmission, since it is not in IR range. Since the proper controller 2500 is in operational mode instead of DISCOVERY mode, it is alerted to the fact that a possible spy has attempted to register the wireless controller 2504. Thus, this condition is communicated to the end user via the web site as is discussed below, and the user can take appropriate action.

Figure 9:
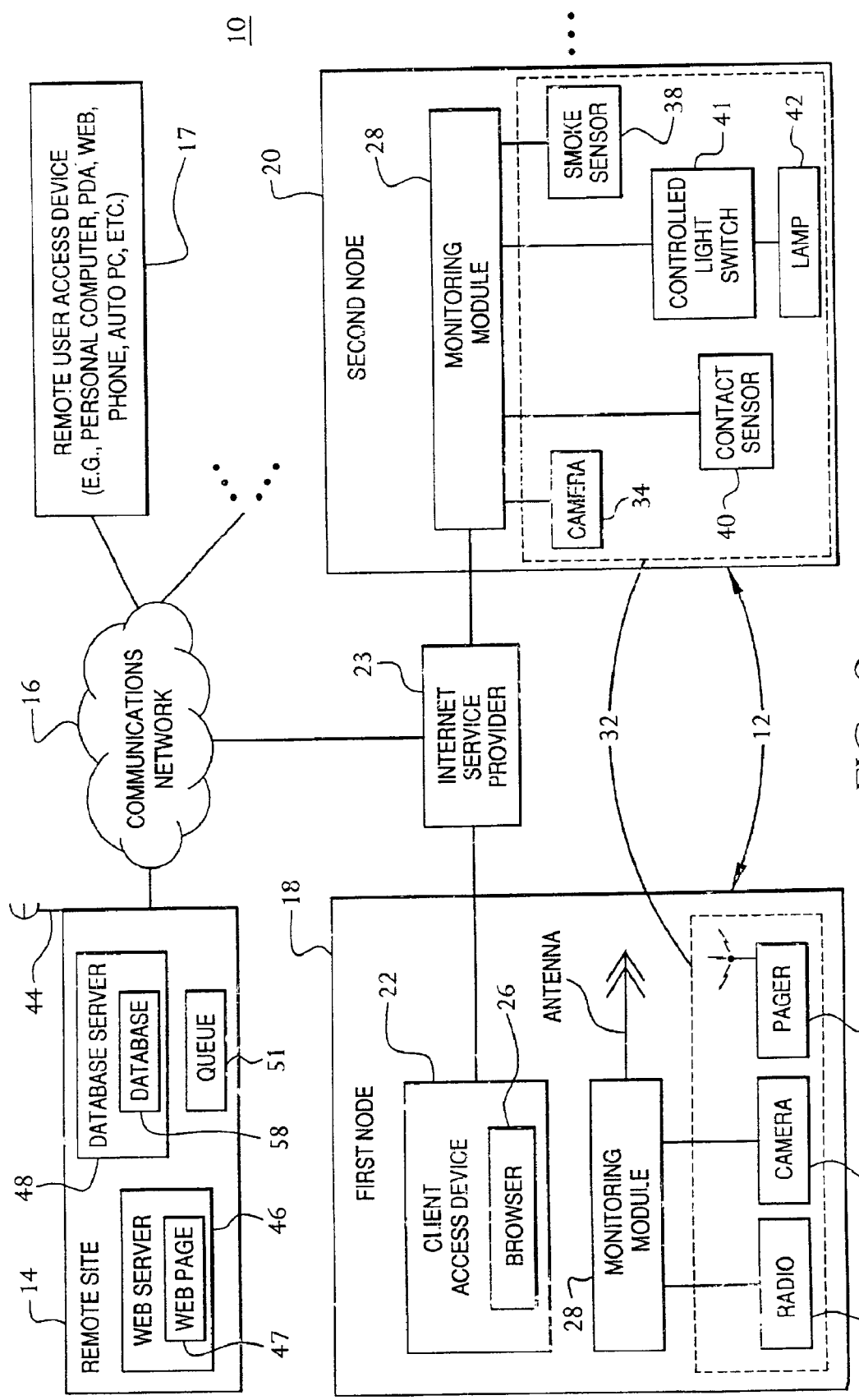
FIG. 9 is a block diagram of an illustrative system for communicating with a wireless devices in accordance with a third embodiment of the present invention.

FIG. 9 shows an illustrative system 10 in accordance with a third embodiment of the present invention. For purposes of clarity, and not by way of limitation, an illustrative client-server based embodiment of the present invention is herein described. The system 10 illustrates how the wireless system 10 can be incorporated into a larger more encompassing client-server system. Similar references symbols are used throughout the embodiments to show like components.

System 10 may include an installation 12 and a remote site 14 that may be linked via a communications network 16. In practice, there may be more than one remote site 14 and installation 12, but only one each is shown to avoid over-complicating the drawing. Remote site 14 may be any suitable remote site that may include equipment such as, for example, one or more servers, mainframes, personal computers, or any other suitable computer-based equipment. Remote site 14 may include a network of suitable computers that may be interconnected in any suitable way, such as, for example, through a local area network, wide area network, telephone network, cable television network, Intranet, Internet, or any other suitable wired or wireless communications network. Communications network 16 may be any suitable communications network, such as, for example, a local area network, wide area network, telephone network, cable television network, Intranet, Internet, or any other suitable wired or wireless communications network. Some suitable wireless communications networks may be global system for mobile communications (GSM), time-division multiple access (TDMA), code-division multiple access (CDMA), Bluetooth, or any other suitable wireless communication networks. Installation 12 and remote site 14 may communicate over communications network 16 using any suitable protocol or protocol stack. For example, installation 12 and remote site 14 may communicate via a transmission control protocol/Internet protocol (TCP/IP) environment using, for example, IP version 4 or IP version 6 (that supports 128-bit network addressing) and a hypertext transfer protocol (HTTP). In another approach, universal plug and play (UPnP) technology may be used to allow communication between installation 12 and remote site 14. Any suitable request-response type of protocol and socket-based packet transport stack, or suitable peer-to-peer communications approach may be used as desired.

Installation 12 and remote site 14 may communicate using any suitable communications. Communications may include, for example, commands, requests, messages, remote procedure calls (e.g., using a proxy-stub pair), or any other suitable client-server or peer-to-peer communication. Communications may also involve, for example, complex communications between application constructs running on installation 12 and remote site 14. Objects running on the client and server may, for example, communicate using an Object Request Broker (ORB). Transmitted information may, for example, be encapsulated as COM objects or Javabeans and persisted to files that are transmitted over a remote access link. In another suitable approach, access communications may include hypertext markup language (HTML) formatted markup language documents (e.g., web pages), that are exchanged between installation 12 and remote site 14 via ISP 23 and communications link 16. For example, communications may comprise of a series of HTTP posts and responses in which the parameters for the transmissions may be sent as name/value pairs in the normal post method. In order to achieve the result of transmitting multiple commands in a single command string, numbered commands may be parsed out and executed at remote site 14. Remote site 14 may be responsible for parsing the command string into individual commands and executing each of those commands. In order to achieve this task of parsing the commands, remote site 14 may utilize a script language and interpreter such as Personal Home Page Tools (PHP) which is embedded within a Web page along with its Hypertext Markup Language (HTML). For example, before a page is sent to the requesting user, the Web server may call PHP to interpret and perform the operations called for. Other similar technologies may also be utilized such as JavaScript, Microsoft's VBScript, or any other applicable script interpreter. If desired, any other suitable client-server or peer-to-peer based approach may be used.

Installation 12 may be operated by a local user. Installation 12 may include one or more nodes. For purposes of illustration, FIG. 9 illustrates an approach having two nodes, first user node 18 and second user node 20. It should be understood that nodes 18 and 20 may be located at a single location, such as the user's main residence. If desired, nodes may be located across more than one location. For example, one node may be in a user's main residence and another at the user's vacation house.

In one embodiment of the present invention, user node 18 may include a client device 22 that may be connected to communications network 16. In Internet-based approaches, such as, for example, as in the embodiment shown in FIG. 9, client device 22 may be connected to the Internet via an Internet service provider (ISP) 23. Client device 22 may be any device suitable for communicating with remote site 14 via communications network 16. For example, client device 22 may be a computer, a personal digital assistant (PDA), a terminal, a set-top box, or any other suitable device that provides access to remote site 14 via communications network 16. Client device 22 may include, for example, an Internet browser application 26 that may be used to access web pages via communications network 16. In other suitable approaches, client device 22 may run a client application that provides locally generated displays propagated with a format obtained using any suitable client-server or peer-to-peer scheme.

Client device 22 may communicate with ISP 23 or directly with communications network 16 using any suitable communications link. For example, the link may include a telephone dial-up link, digital subscriber lines (DSL), a cable modem link (e.g., a data over cable service interface specification (DOCSIS)), a satellite link, a computer network link (e.g., Ethernet link, T1 line, etc.) or any other suitable communications link or combination of communications links.

Remote site 14 may include one or more servers such as, for example, web server 46 and database server 48. Database server 48 may maintain database 58. In other suitable approaches, such as non-Internet based approaches, remote site 14 may include an application server and any other suitable server or combination of servers. As herein used, the term "server" is not limited to a distinct piece of computing hardware or storage hardware, but may also be a software application or a combination of hardware and software. For example, one computer may have software that enables the computer to act as both a web server and as a database server.

In some suitable approaches, remote site 14 may provide displays or display definitions to client device 22. In the Internet-based approach of FIG. 1, for example, web server 46 may generate static and dynamic web pages from data supplied by database server 48. Web page 47 may be viewed by a user using Internet browser 26 running on client device 22.

Software applications interfacing installation 12 with remote site 14 may be created using any suitable platform and/or software development tools. For example, Java 2 Enterprise Edition, Javabeans, component object model (COM) based technologies (e.g., ActiveX, object linking and embedding (OLE), etc.), Javascript, Visual Basic, C, C++, scripting languages, or any combination of these or other suitable development tools may be used in creating the software interface between installation 12 and remote site 14 (e.g., web-page interface). Any combination of these or other suitable development tools may be used in preparing any other software modules or applications for use in any other suitable facet of the present invention.

Remote site 14 may function as the master controller of the system shown in system 10. In addition, users may access the system shown in system 10 via any computer, monitoring module, or remote user access device linked to communications network 16. Remote user access devices (such as remote user access device 17 in FIG. 9) may include, for example, personal digital assistants, cellular telephones, set-top boxes, personal computers, or any other suitable device a user may use to access remote site 14 via communications network 16.

Monitoring modules 28 may serve as an interface between remote site 14 and at least one control device 32. The monitoring module 28 is equivalent to the controller 28 referred to in the embodiment of FIGS. 1–4. Monitoring modules 28 may be any suitable hardware, software, or a combination thereof and may be included at any point within the system. For example, monitoring module 28 may be a software application running on client device 22 or a separate piece of hardware that may be connected to client device 22 (as shown at node 18) or partially implemented as software on client device 22 and a separate piece of hardware. In some embodiments, monitoring module 28 may be a stand-alone appliance (as shown at node 20) connected to communications network 16, operating separately and independently from client device 22. Each monitoring module may be shipped with a model identification code, or with the capacity to generate such a code, that may serve to identify each particular monitoring module's model type.

One or more monitoring modules or service brokers may be installed at one or more locations. Monitoring modules may be installed by the user (or any other suitable person) by, for example, connecting the modules to client device 22 that may communicate with remote site 14 over communications network 16. The connection between the monitoring module and the client access device and between devices and the monitoring module may be in the form of a universal serial bus (USB) connection, parallel port connection, serial connection (e.g., RS-232), Firewire connection, any combination of these, or any other suitable type of connection. If desired, monitoring modules may be given the capability (e.g., processing hardware, communications equipment, etc.) to communicate, via communications network 16, without the use of a client access device. Monitoring modules may link attached devices or appliances (e.g., sensors, cameras, microwaves, refrigerators, etc.) with remote site 14 via communications network 16. One or more monitoring modules 28 may provide data from attached devices and appliances to remote site 14 via communications network 16. The term "device," as defined herein, shall include any suitable device or appliance whether it is wired or wireless.

At least one device 32 may be interfaced with and controlled by each monitoring module 28. Connections between monitoring module 28 and the various devices 32 may be hardwired or wireless such as described in connection with the first embodiment of FIGS. 1–4. Devices 32 may encompass any suitable device capable of being controlled or mediated by an external controller. Such devices may include, but are not limited to, a camera 34, a radio 36, a wireless smoke or fire detector 38, a wireless contact sensor 40, and a wireless light switch 41. Although not illustrated, other suitable devices may include, for example, various audio input and output devices, various visual displays, washers/driers, microwave ovens, cooking ranges, car alarms, plant watering devices, sprinkler, thermostats, carbon monoxide sensors, humidistats, rain gauges, video cassette recorders, radio tuners, or any other suitable device and the like.

One or more notification devices, such as pager 43, may also be incorporated into the system. As illustrated in FIG. 9, pager 43 is in wireless communication with a wireless or cellular transmitter 44 associated with remote site 14. Other suitable notification devices include, for example, e-mail clients, wireless hand-held computers, wireless wearable computer units, automatic web notification via dynamic web content, telephone clients, voice mail clients, cellular telephones, instant messaging clients, and the like.

System 10 provides users with opportunities to remotely control and monitor devices 32 using remote user access devices 17 via communications network 16. In the example of FIG. 9, users may control devices 32 that are interfaced with monitoring modules 28 at node 18 and devices 32 interfaced with monitoring module 28 at node 20. In practice, there may be a single node, or more nodes, depending on, for example, the user's equipment, number of sites, or other suitable parameters. In practice, a suitable system architecture and communications network 16 may allow users, or anyone that users permit, to readily monitor and control monitoring modules 28 from any location using any suitable device that is capable of communicating with remote site 14 via communications network 16.

In another suitable approach, users may access installation 12 using remote user access devices 17 without the use of remote site 14. For example, remote user access devices 17 may be used to communicate with monitoring modules 28 of installation 12 via communication network 16 and ISP 23. If desired, two-way communications may be implemented using this approach. Remote user access device may access installation 12 using, for example, special IP addresses assigned to a particular monitoring module, node, installation, or any other suitable element of the installation. The use of IP addresses is merely illustrative. Any other suitable addressing may be used to allow access to an installation from a remote used access device.

Devices 32 may be programmed at the installation in terms of how they respond to certain events (e.g., what does the camera do when the contact sensor is triggered?). Alternatively, devices 32 may be programmed from a remote location using remote user access device 17, for example. The programming may be stored in devices 32, monitoring modules 28, or at remote site 14.

The following examples of the uses of illustrative devices will illustrate the operation of the present invention. For example, contact sensor 40 of FIG. 9 may be associated with the front door (not shown) of a remote location associated with second node 20. Contact sensor 40 may be configured to trip whenever the front door is opened. Camera 34 is also positioned to view the front door location and may be programmed to take a digital picture whenever the sensor contact 40 is tripped. This picture may be transmitted over communications network 16 and stored in database server 48. When contact sensor 40 detects that the front door has been opened, an event notification or alarm trigger may be transmitted by monitoring module 28 to database server 48. Database server 48 may have been previously programmed to transmit a notification event to the user's pager, for example, via cellular transmitter 44. As the contact sensor is tripped, camera 34 may take a picture of the front door and may transmit that picture, via monitoring module 28 and communications network 16, to database server 48. The user, having been notified via pager 42, may now access the picture using web server 46 of remote site 14 via Internet browser 26. In this way, the user may determine who has entered the front door of his or her home.

As another example, system 10 may allow a user located at one node 18 to control a device at a second node 20. The user may contact web server 46 via, for example, Internet browser 26 of node 18 in order to access a database entry for light switch 41 of node 20. A virtual representation of the light switch 41 may be made available to the user by web server 46 and may be manipulated by the user to remotely change the state of light switch 41 and the connected lamp 42. For example, the system may allow the user to change the state of lamp 42 from being "off" to being "on" by, for example, manipulating the virtual light switch from web server 46 and a corresponding command would be placed in the queue of waiting commands on the server component.

Periodically, the controlling module or monitor 28 may poll remote site 14 looking for waiting commands, such as the change state command of light switch 41. Thereafter, the command may be transmitted to monitoring device 28 that would instruct the light switch to change from the "off" state to the "on" state, thus turning on lamp 46. This change in state of lamp 46 may be viewed by an appropriately positioned camera, such as camera 34, which would be used to visually monitor the remote location 20 to determine whether the command had been completed successfully. If the command had not been successfully completed, then an error message may be communicated to the user, using for example, the means specified by the user's notification preferences or through any other suitable means of communicating information to the user. This is merely an illustrative approach for detecting a change is state of a device. In another suitable approach, lamp 46 may be in two-way communications with a corresponding device driver. The device driver may query the lamp to determine whether it was on after executing a "turn on" command. Any such suitable approach may be used for detecting a state in change of a device.

Figure 10:
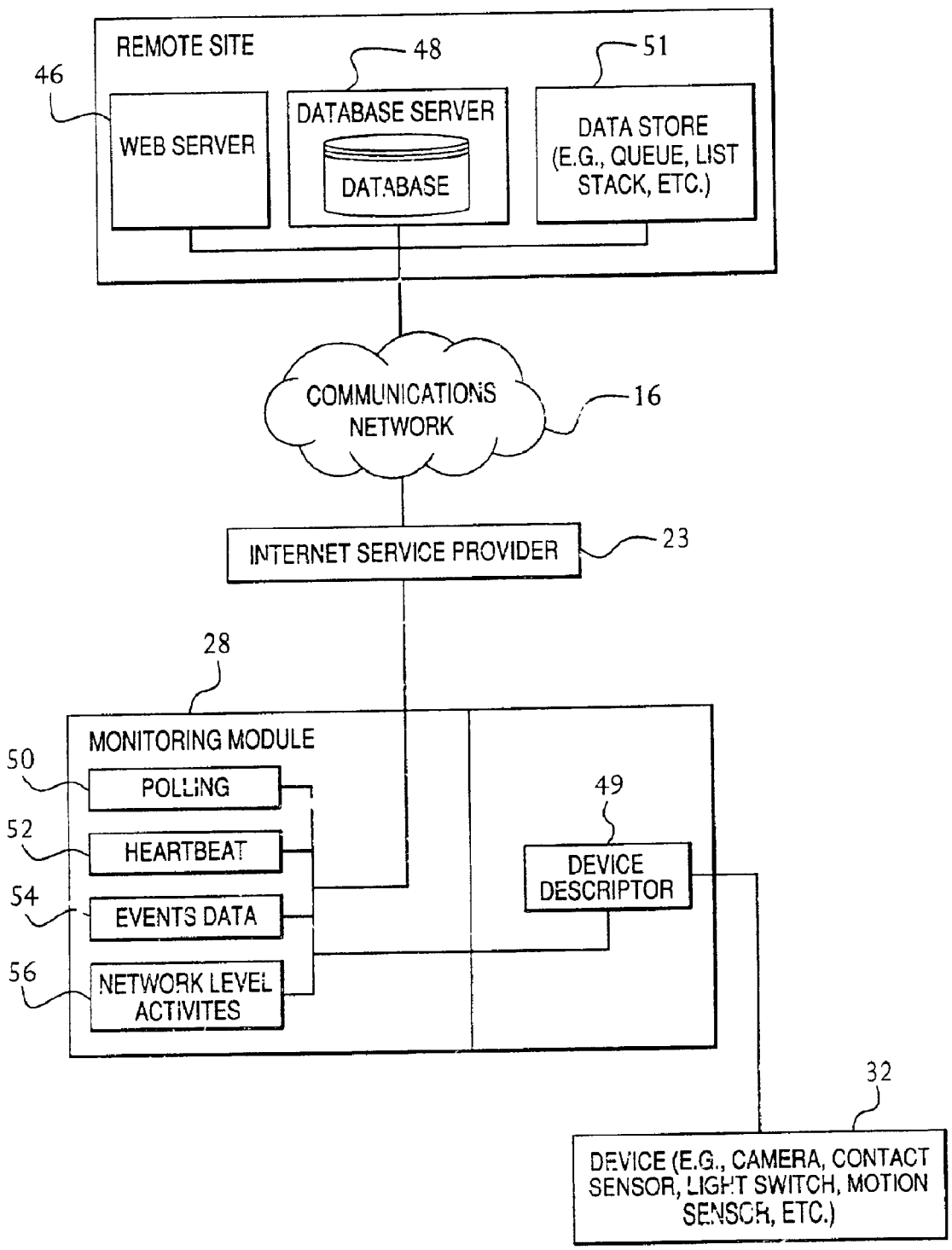
FIG. 10 s a block diagram of some of the components of the illustrative system for communicating with a wireless device of FIG. 9 in accordance with the third embodiment of the present invention.

Referring now to FIG. 10, monitoring module 28 may serve, for example, as a common connection point for one or more devices 32 at an installation 12 and as the interface between devices 32 and remote site 14 via communications network 16. Monitoring module or service broker 28 may, for example, serve as a translation and brokering agent between remote site 14 and devices 32.

In one suitable embodiment, monitoring module 28 may be software made up of multiple dynamically loaded objects, or device descriptors 49, that may allow remote site 14 to interface with the devices 32. The dynamically loaded device descriptors 49 may act as device drivers for devices 32, translating, in both directions, monitoring, command, and control data exchanged between monitoring module 28 and remote site 14 via communications network 16. Each device descriptor 49 may also translate the signals received from monitoring module 28 into the specific electrical signals that are required to communicate with (both input and output) and control its associated device 32. Device descriptor 49 may be provided for each specific device 32 when, for example, different devices 32 have different interfaces and require specific sets of electrical signals for their monitor and control.

Device descriptors 49 may include, for example, a manufacturer identification, product identification, and driver version number to allow a device to be referenced correctly. Once a new device 32 has been detected and is to be integrated into the system, monitoring module 28 may reference, download, and run the appropriate drivers for the new device.

After loading a new descriptor 49, monitoring module 28 may communicate with remote site 14 to determine whether device 32 has been previously catalogued. Monitoring module 28 may, for example, determine if a general description and a default state of device 32 exists at the remote site.

When a device 32 has been catalogued, then, for example, static parameters, such as the manufacturer name, may be communicated from monitoring module 28 to remote site 14 and the default state of device 32 may exist at remote site 14. When a device 32 is not already catalogued, device 32 may communicate its default state and static parameters to monitoring module 28 that may, in turn, communicate the default state and static parameters to remote site 14. The communication from monitoring module 28 to remote site 14 may be done using name/value pairs using, for example, the normal HTTP post method discussed hereinbefore. For example, a template document may be a static parameter of device 32.

Figure 11:
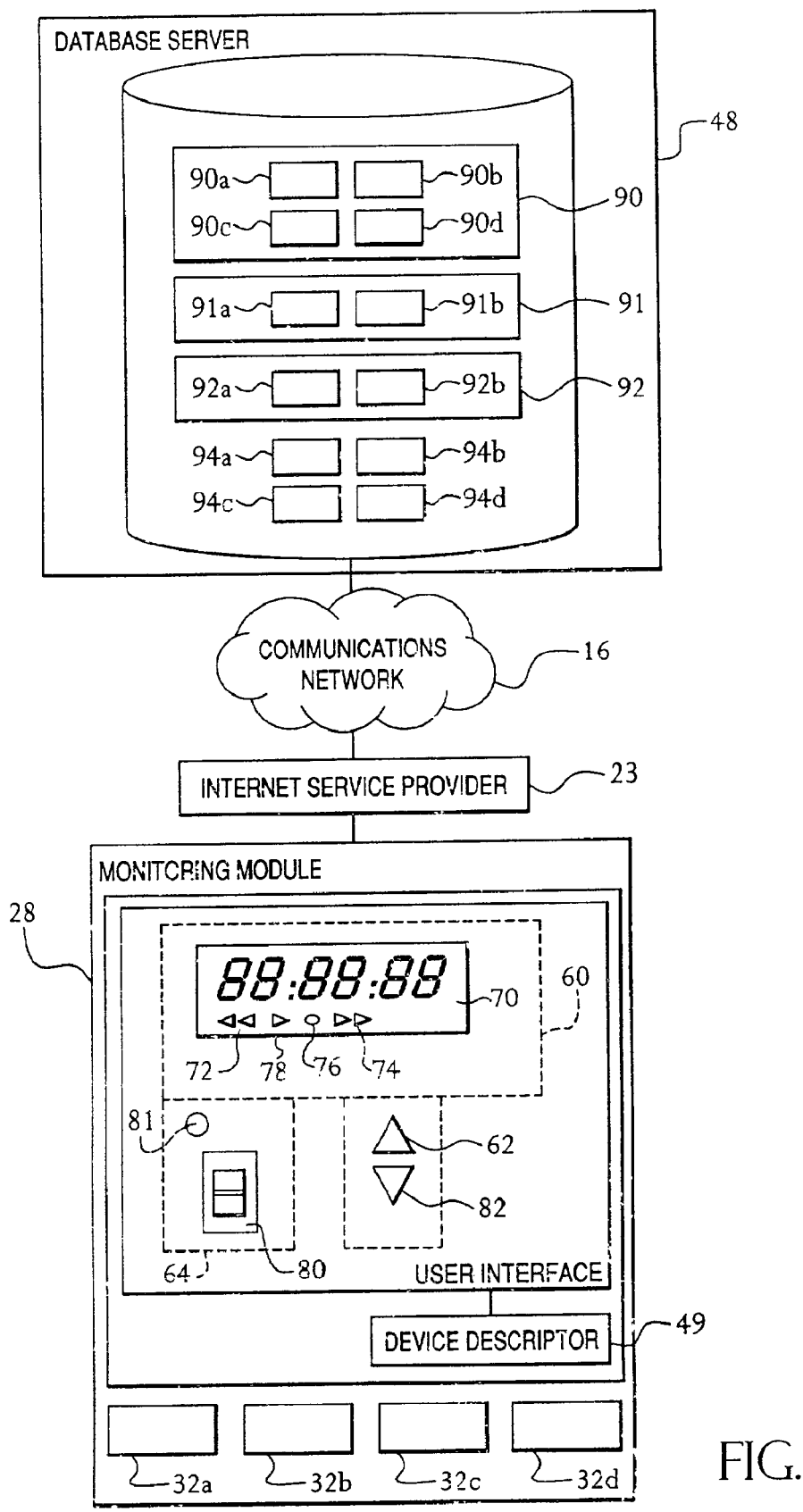
FIG. 11 is a block diagram of some of the components of the illustrative system for communicating with a wireless device of FIG. 9 in accordance with the third embodiment of the present invention.

FIG. 11 shows five devices, 32, 32a, 32b, 32c, 32d. In practice, there may be more or fewer devices with each installation. Each device may be interfaced to a monitoring module 28 via a device descriptor or driver 49 (only one shown). Each device may include a customizable user interface 58 that may be viewable on a remote user access device over communications network 16. Interfaces 58 may include virtual representations of the actual user interfaces of the devices.

In another approach, virtual representations may be stored on, for example, web server 46. Remote site 14 may use changes in device states to change the virtual representations of the devices with which the changed states are associated. A virtual representation of a device, as previously described, may be either a text-based, symbol-based, or image-based representation of an actual device 32 from the installation as it appears to a user who accesses the remote site from a location remote to the installation using any suitable remote user access device. For example, if the device is a light switch, the corresponding virtual representation may be an indicator icon that may be either green or red. If the indicator icon is green, that may denote that the actual light switch is in the "on" position. If the indicator is red, that may denote that the light switch is in the "off" position. If, during a heartbeat operation, remote site 14 is informed that the state of the light switch changes from "on" to "off," then the virtual representation of the light switch may change from being green to being red.

User interface 58 may include at least one resource. In the example of FIG. 11, resources 60, 62, and 64 are shown. Resources may provide users with access to features specific to their associated device. For example, the device shown in FIG. 11 represents a videocassette recorder (VCR) having a recording setting resource 60, a channel selecting resource 62, and a power selecting resource 64. Typical VCRs may have other operational resources, but the resources illustrated in FIG. 11 are sufficient to illustrate the operation of the device.

Each resource 60, 62, 64 may include one or more display components. For example, the recording setting resource 60 includes a display component 70 and a series of pushbuttons 72, 74, 76, 78 which a user may use to activate the VCR's fast forward, reverse, play, and stop functions, respectively. The channel selecting resource 62 may include the display component 70 and a pair of pushbuttons 82 that users may use to activate up channel and down channel functions of the VCR. The power selecting resource 64 may include a toggle switch 80 that user may use to activate the VCR's power on and power off commands, and an LED indicator 81 that may indicate the power condition of the VCR.

Other suitable display components may include toggle buttons, radio buttons, absolute sliders, proportional sliders, edit fields, labels, images, video clips, streaming video, streaming audio, multiselect list, time fields, date fields, N-directional components, N-state buttons, N-state selectors (where N may be any suitable integer), trees, tables, graphs, charts, drawing pads, streaming audio, banners, or any other suitable display components. Display components may act as status indicators. If desired, display components allow users to toggle settings or otherwise manipulate devices 32. For example toggle buttons may serve as indicators, showing, for example, whether a device is in the "on" position or in the "off" position. Toggle buttons may allow users to change the state of a device, by, for example, turning a device on or off. Sliders may act as indicators by showing, for example, the percentage complete of a particular process a device may be performing (e.g., baking a cake), and may allow users to change the state of a device (e.g., changing the thermostat temperature). Edit fields may allow users to change textual representations of suitable elements (e.g., naming a television show to be recorded by the show's name). Video, audio, images, or any other suitable media-based components may act as indicators showing what the devices are sensing (e.g., images may be sensed by cameras, streaming video may be sensed by camcorders, audio clips may be sensed by audio recorders, etc.). Date and time fields may act as indicators, by, for example, displaying what date and time a VCR is set to start recording. Date and time fields may allow users to set the date and time a VCR may start recording. Multiselect lists may act as indicators by, for example, listing all sound sensors that are detecting noise in the house. Multiselect lists may also be used, for example, to select some of a number of available sensors to turn on.

A virtual representation of each device 32, 32a, 32b, 32c, 32d may be stored as a record 94, 94a, 94b, 94c, 94d in the database of database server 48 of remote site 14. Each record may contain an entry for each resource and its associated components which make up the device. For example, record 94 for VCR device 32 may contain an entry 90, 91, 92 for each resource 60, 62, and 64, respectively, and an entry 90a, 90b, 90c, 90d, 91a, 91b, 92a, and 92b for each component 70, 72, 72, 74, 80, 81, and 82, respectively. In addition, a web page 47 may be generated by web server 46 by extracting the associated record for that device from database server 48 and creating a graphical, textual, tactile, aural, or other similar modality user interface representation of that device that the user may access via, for example, Internet browser 26.

One of the functions that monitoring module 28 may serve is to persist the state of devices 32. This may be done, for example, to allow the real-time states of devices 32 to be stored, to communicate to remote site 14, or to allow for easy recovery from a system crash.

The stored state of devices 32 may also be used for maintaining a synchronized relationship between an installation 12 and remote site 14. In one possible embodiment of the present invention, remote site 14 and installation 12 may use polling and heartbeat mechanisms in order to synchronize state information between remote site 14 and installation 12. Polling may refer to a process whereby monitoring module 28 obtains commands from remote site 14. The commands may reside, for example, in command queue 51. Commands may be accumulated at command queue 51 as a result of any suitable action by the user, by remote site 14, or by both. For example, a user may use a remote user access device to issue a command or a request to remote site 14 to cause a change in state of one of devices 32 (e.g., to turn a lamp on). Remote site 14 may post the change in state command to a command queue 51.

Monitoring module 28 may communicate a request for pending commands to remote site 14. This request may be communicated periodically as part of the polling process. In response to the monitoring module's request, remote site 14 may provide one or more pending commands from command queue 51, and may notify monitoring module 28 of the number of remaining pending commands in command queue 51. Monitoring module 28 may then again communicate a request for pending commands. Remote site 14 may return more of the pending commands from command queue 51. This process may continue until command queue 51 at remote site 14 is empty.

Remote site 14 may provide commands to monitoring module 28 using any suitable algorithm. For example, remote site 14 may return commands using first-come, first-serve, round robin, first-in, first-out, weighted prioritization, or any other suitable algorithm. Remote site 14 may also proactively inform monitoring module 28 that commands are waiting in queue 51. Monitoring module 28 may then poll remote site 14 and retrieve commands from remote site 14 until the queue is empty.

Whereas polling process 50 is used by remote site 14 to effect state changes in devices 32 via monitoring module 28, monitoring module 28 may use heartbeat process 52 to update device state information at remote site 14. A heartbeat may be a periodic communication from monitoring module 28 to remote site 14 containing updated state information for devices 32 associated with monitoring module 28. In one suitable heartbeat process 52, monitoring module 28 may send a communication to remote site 14 in response to a change in state of a device 32, a synchronization of a device 32 with remote site 14, a triggered alert event, or in response to any other suitable event. In such a heartbeat operation 52, all data intended to be transmitted to remote site 14 may be transmitted to remote site 14 via communications network 16. Remote site 14 may transmit an acknowledgment of receipt and successful processing of the data back to monitoring module 28.

Remote site 14 may direct monitoring module 28 to make changes in its own state by, for example, posting commands to data store 51. For example, remote site 14 may post commands that set or modify the polling 50 or heartbeat 52 time intervals. Upon reaching the end of the current polling interval, monitoring module 28 may send a communication to remote site 14, requesting any queued commands. Monitoring module 28 may continue to poll, using a preselected communication scheme, until the queue of commands waiting for monitoring module 28 is empty. Each command received from the queue may be acted upon when the command is received and any associated state changes are effected. Remote site 14 may transmit an acknowledgment of receipt and successful processing of the data back to monitoring module 28.

If desired, remote site 14 may send unsolicited communications to monitoring module 28. Remote site 14 may send communications to, for example, set or update the heartbeat or polling time, or to cause monitoring module 28 to issue a command to update a component of a device. Remote site 14 may send unsolicited communications to monitoring module 28 for any other suitable purpose.

In addition to maintaining the polling and heartbeat operations and exchanging communications for events, data, and commands 54 with remote site 14, monitoring module 28 may also take care of many network level activities 56. These activities may include, but are not limited to verifying passwords, dialing up an ISP, if necessary, periodically uploading accounting/billing information, and performing security measures. Any other suitable network level activities may be performed by monitoring module 28.

While certain preferred embodiments and various modifications thereto have been described or suggested, other changes in these preferred embodiments will occur to those of ordinary skill in the art which do not depart from the broad inventive concepts of the present invention. Accordingly, reference should be made to the appended claims rather than the specific embodiment of the foregoing specification to ascertain the full scope of the present invention.

What is claimed is:

1. A method for registering and authenticating a wireless device, comprising the steps of:

providing a controller having a discovery mode and an operating mode, in the discovery mode the controller being capable of registering wireless devices, and in the operating mode the controller being capable of receiving transmissions from a wireless device that has been registered;

providing a wireless device which is capable of communicating wirelessly with the controller, the wireless device having an actuator for initiating at least one transmission of registration data, the registration data containing a unique token for verifying the identity of the wireless control device;

placing the controller into the discovery mode;

actuating the actuator of the wireless device to wirelessly transmit the registration data from the wireless device to the controller; and returning to the operational mode of the controller, whereby the wireless device is registered with the controller, wherein the at least one transmission of registration data comprises a plurality of sequential transmissions, and wherein one of the registration data transmissions comprises a first signature transmission for identifying that the subsequent transmissions are registration transmissions.

2. The method set forth in claim 1, wherein the wireless device comprises an RF transmitter and wherein the controller is capable of receiving RF transmissions from the wireless device.

3. The method set forth in claim 2, wherein in the operational mode, the wireless device transmits RF transmissions via the RF transmitter to the controller.

4. The method set forth in claim 1, wherein the wireless device further comprises an IR transmitter and wherein the controller is capable of receiving IR transmissions from the wireless device.

5. The method set forth in claim 4, wherein in the discovery mode the wireless device transmits the registration data via the IR transmitter to the controller.

6. The method set forth in claim 3, wherein the wireless device further comprises an IR transmitter and wherein the controller is capable of receiving IR transmissions from the wireless device.

7. The method set forth in claim 6, wherein in the discovery mode the wireless device transmits the registration data via the IR transmitter to the controller.

8. The method set forth in claim 1, wherein the actuator of the wireless device comprises a mechanical control, an electrical control, a software control, a physical control, a tactile control, or an audible control.

9. The method set forth in claim 1, wherein the wireless device is a wireless sensor having a sensor front end for receiving event data.

10. The method set forth in claim 9, wherein the wireless sensor includes a non-volatile storage device for storing a serial number associated with the sensor device.

11. The method set forth in claim 10, wherein the non-volatile storage device further stores functional parameters for the sensor front end.

12. The method set forth in claim 9, wherein the serial number forms a part of the registration data.

13. The method set forth in claim 12, wherein the functional parameters for the sensor device are transmitted along with the registration data.

14. The method set forth in claim 1, wherein the controller returns to the operational mode automatically after at least one wireless device has been successfully registered.

15. The method set forth in claim 1, wherein the controller returns to the operational mode automatically after a preselected time interval.

16. The method set forth in claim 1, wherein the controller includes an actuator for switching between the operational mode and the discovery mode.

17. The method set forth in claim 16, wherein the actuator of the controller comprises a mechanical control, an electrical control, a software control, a physical control, a tactile control, an audible control.

18. The method set forth in claim 1, wherein the at least one transmission of registration data comprises a first signature byte for identifying that the at least one transmission is a registration transmission.

19. The method set forth in claim 1, wherein one of the registration data transmissions comprises a serial number for identifying the wireless device.

20. The method set forth in claim 19, wherein the serial number is a unique serial number.

21. The method set forth in claim 19, wherein one of the registration transmissions includes a second signature transmission.

22. The method set forth in claim 19, wherein the second signature byte is identical to the first signature transmission.

23. The method set forth in claim 21, wherein at least one of the registration transmissions comprises an additional serial number transmission.

24. The method set forth in claim 21, wherein the at least one of the registration transmissions includes a circular redundancy check transmission.

25. The method set forth in claim 23, wherein the at least one circular redundancy check transmission includes a plurality of circular redundancy check transmissions.

26. The method set forth in claim 19, wherein at least one of the registration transmissions includes a circular redundancy check transmission.

27. The method set forth in claim 24, wherein the at least one circular redundancy check transmission includes a plurality of circular redundancy check transmissions.

28. The method set forth in claim 1, wherein the data transmission includes a synchronization pulse.

29. The method set forth in claim 28, wherein the synchronization pulse is located at the start of each data transmission.

30. The method set forth in claim 28, wherein the synchronization pulse comprises at least one ON bit and at least one OFF bit.

31. The method set forth in claim 28, wherein the synchronization pulse comprises two ON bits and one OFF bit.

32. The method set forth in claim 30, wherein the controller resynchronizes at the trailing edge of the at least one ON bit.

33. The method set forth in claim 31, wherein the controller resynchronizes at the trailing edge of the second ON bit.

34. The method set forth in claim 28, wherein the controller resynchronizes at the trailing edge of the synchronization pulse.

35. The method set forth in claim 1, wherein the wireless device comprises a primary channel transmitter and wherein the controller is capable of receiving secure primary transmission from the wireless device.

36. The method set forth in claim 35, wherein the wireless device further comprises a registration channel and wherein the controller is capable of receiving the registration transmissions from the wireless device.

37. The method set forth in claim 1, wherein data that allows the controller to operate the wireless device includes parameters, device descriptors, and rules associated with operation of the wireless device.

38. The method set forth in claim 1, wherein the registration data contains data that allows the controller to operate the wireless device.

39. A method for registering and authenticating a wireless device, comprising the steps of:
providing a controller having a discovery mode and an operating mode, in the discovery mode the controller being capable of registering wireless devices, and in the operating mode the controller being capable of receiving transmissions from a wireless device that has been registered;
providing a wireless device which is capable of communicating wirelessly with the controller, the wireless device having an actuator for initiating at least one transmission of registration data, the registration data containing a unique token for verifying the identity of the wireless control device;
placing the controller into the discovery mode;
actuating the actuator of the wireless device to wirelessly transmit the registration data from the wireless device to the controller; and
returning to the operational mode of the controller,
whereby the wireless device is registered with the controller, and
wherein the at least one transmission of registration data includes at least nine transmissions comprising a first signature transmission, a first serial number transmission, a first data transmission, a second serial number transmission, a third serial number transmission, a second data transmission, a second signature transmission, a first circular redundancy check transmission, and a second circular redundancy check transmission.

40. A system for registering and authenticating a wireless device, comprising:
- a controller having a discovery mode and an operating mode, in the discovery mode the controller being capable of registering wireless devices, and in the operating mode the controller being capable of receiving transmissions from a wireless device that has been registered;
- a wireless device which is capable of communicating wirelessly with the controller, the wireless device having an actuator for initiating at least one transmission of registration data, the registration data containing a unique token for verifying the identify of the wireless control device;
- whereby the wireless device is registered upon actuation of the wireless device when the controller is in discovery mode by wirelessly transmitting the registration data from the wireless device to the controller, wherein the at least one transmission of registration data comprises a first signature transmission for identifying that the at least one transmission is a registration data transmission, and wherein one of the registration data transmissions includes a second signature transmission.

41. The system set forth in claim 40, wherein the wireless device comprises an RF transmitter and wherein the controller is capable of receiving RF transmissions from the wireless device.

42. The system set forth in claim 41, wherein the wireless device further comprises an IR transmitter and wherein the controller is capable of receiving IR transmissions from the wireless device.

43. The system set forth in claim 42, wherein in the discovery mode the wireless device transmits the registration data via the IR transmitter to the controller.

44. The system set forth in claim 40, wherein the actuator of the wireless device comprises a mechanical control, an electrical control, a software control, a physical control, a tactile control, or an audible control.

45. The system set forth in claim 40, wherein the wireless device is a wireless sensor having a sensor front end for receiving event data.

46. The system set forth in claim 45, wherein the wireless sensor includes a non-volatile storage device for storing a serial number associated with the sensor device.

47. The system set forth in claim 45, wherein the serial number forms a part of the registration data.

48. The system set forth in claim 40, wherein the at least one transmission of registration data comprises a plurality of sequential transmissions.

49. The system set forth in claim 48, wherein one of the registration data transmissions comprises a serial number for identifying the wireless device.

50. The system set forth in claim 40, wherein the second signature transmission is identical to the first signature transmission.

51. The system set forth in claim 40, wherein at least one of the registration data transmissions comprises an additional serial number transmission.

52. The system set forth in claim 40, wherein the at least one of the registration data transmissions includes a circular redundancy check transmission.

53. The system set forth in claim 40, wherein the at least one registration data transmission includes at least nine transmissions comprising a first signature transmission, a first serial number transmission, a first data transmission, a second serial number transmission, a third serial number transmission, a second data transmission, a second signature transmission, a first circular redundancy check transmission, and a second circular redundancy check transmission.

54. The system set forth in claim 40, wherein the data transmission includes a synchronization pulse.

55. The system set forth in claim 54, wherein the synchronization pulse is located at the start of each data transmission.

56. The system set forth in claim 40, wherein the synchronization pulse comprises at least one ON bit and at least one OFF bit.

57. The system set forth in claim 40, wherein the data that allows the controller to operate the wireless device includes parameters, device descriptors, and rules associated with operation of the wireless device.

58. The system set forth in claim 40, wherein the registration data contains data that allows the controller to operate the wireless device.

* * * * *